United States Patent
Akai et al.

(10) Patent No.: US 10,209,835 B2
(45) Date of Patent: Feb. 19, 2019

(54) TOUCH DETECTING DEVICE AND SEMICONDUCTOR DEVICE

(71) Applicant: Synaptics Japan GK, Tokyo (JP)

(72) Inventors: Akihito Akai, Tokyo (JP); Takayuki Noto, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 434 days.

(21) Appl. No.: 14/577,708

(22) Filed: Dec. 19, 2014

(65) Prior Publication Data

US 2015/0185951 A1    Jul. 2, 2015

(30) Foreign Application Priority Data

Dec. 27, 2013   (JP) ................................ 2013-271228

(51) Int. Cl.
    *G06F 3/041*    (2006.01)
    *G06F 3/044*    (2006.01)
(52) U.S. Cl.
    CPC ............ *G06F 3/044* (2013.01); *G06F 3/0418* (2013.01)
(58) Field of Classification Search
    None
    See application file for complete search history.

(56) References Cited

U.S. PATENT DOCUMENTS

| | | | | |
|---|---|---|---|---|
| 2011/0304570 | A1* | 12/2011 | Maeda | ................ G06F 3/044 345/173 |
| 2012/0256869 | A1* | 10/2012 | Walsh | ................ G06F 3/0416 345/174 |
| 2014/0125613 | A1* | 5/2014 | Komatsu | ............. G06F 3/0416 345/173 |
| 2015/0185951 | A1 | 7/2015 | Akai et al. | |

FOREIGN PATENT DOCUMENTS

| | | |
|---|---|---|
| CN | 101685364 A | 3/2010 |
| CN | 101840294 A | 9/2010 |
| JP | 2012234473 A | * 11/2012 |

* cited by examiner

*Primary Examiner* — Alexander Eisen
*Assistant Examiner* — Kebede Teshome
(74) *Attorney, Agent, or Firm* — Patterson + Sheridan, LLP

(57) ABSTRACT

A touch panel controller is provided with a calibration circuit that performs offset adjustment with respect to input signals of a plurality of detection circuits corresponding to a plurality of X electrodes of the touch panel, and a storage device that stores first parameter data that specifies an offset adjustment operation of the calibration circuit, and second parameter data for correction for the first parameter data.

20 Claims, 20 Drawing Sheets

{a: X-LINE IS CHARGED WITH VHSP (NON-DETECTION), b: DETECTION}

Fig.9

| TPC_CALADJON | ADJUSTMENT FUNCTION OF CALIBRATION DATA |
|---|---|
| 1'b0 | FUNCTION IS TURNED OFF |
| 1'b1 | FUNCTION IS TURNED ON |

Fig.11

| CADJ_Data[y][x]/ CALADJ[5:0] | value | CADJ_Data[y][x]/ CALADJ[5:0] | value |
|---|---|---|---|
| 6'h00 | 0 | 6'h20 | -32 |
| 6'h01 | 1 | 6'h21 | -31 |
| 6'h02 | 2 | 6'h22 | -30 |
| 6'h03 | 3 | 6'h23 | -29 |
| 6'h04 | 4 | 6'h24 | -28 |
| 6'h05 | 5 | 6'h25 | -27 |
| 6'h06 | 6 | 6'h26 | -26 |
| 6'h07 | 7 | 6'h27 | -25 |
| 6'h08 | 8 | 6'h28 | -24 |
| 6'h09 | 9 | 6'h29 | -23 |
| 6'h0A | 10 | 6'h2A | -22 |
| 6'h0B | 11 | 6'h2B | -21 |
| 6'h0C | 12 | 6'h2C | -20 |
| 6'h0D | 13 | 6'h2D | -19 |
| 6'h0E | 14 | 6'h2E | -18 |
| 6'h0F | 15 | 6'h2F | -17 |
| 6'h10 | 16 | 6'h30 | -16 |
| 6'h11 | 17 | 6'h31 | -15 |
| 6'h12 | 18 | 6'h32 | -14 |
| 6'h13 | 19 | 6'h33 | -13 |
| 6'h14 | 20 | 6'h34 | -12 |
| 6'h15 | 21 | 6'h35 | -11 |
| 6'h16 | 22 | 6'h36 | -10 |
| 6'h17 | 23 | 6'h37 | -9 |
| 6'h18 | 24 | 6'h38 | -8 |
| 6'h19 | 25 | 6'h39 | -7 |
| 6'h1A | 26 | 6'h3A | -6 |
| 6'h1B | 27 | 6'h3B | -5 |
| 6'h1C | 28 | 6'h3C | -4 |
| 6'h1D | 29 | 6'h3D | -3 |
| 6'h1E | 30 | 6'h3E | -2 |
| 6'h1F | 31 | 6'h3F | -1 |

| | MEASUREMENT TEMPERATURE | CADJ_Data[7:0] | CORRECTION VALUE |
|---|---|---|---|
| T1 | -40~0°C | 8'h3B | -5 |
| T2 | 0~10°C | 8'h3F | -1 |
| T3 | 10~35°C | 8'h00 | 0 |
| T4 | 35~50°C | 8'h09 | 9 |
| T5 | 50~90°C | 8'h14 | 20 |

TOUCH DETECTING DEVICE AND SEMICONDUCTOR DEVICE

CROSS-REFERENCE TO RELATED APPLICATIONS

The Present application claims priority from Japanese application JP 2013-271228 filed on Dec. 27, 2013, the content of which is hereby incorporated by reference into this application.

BACKGROUND

Technical Field

The present invention relates to a touch detecting device and a semiconductor device that is applied thereto, and particularly, to a technology of adjusting offset of a detection target capacitor of a touch panel, for example, a technology that is effectively applied to a touch sense input system and the like of a personal digital assistant (PDA) or a tablet personal computer (PC).

Description of the Related Art

In a touch panel, which corresponds to multi-point touching by a mutual capacitance method, for example, Y electrodes as drive electrodes and X electrodes as detection electrodes are disposed to be perpendicular to each other with a dielectric interposed therebetween, and an intersection capacitor as a cross-coupling capacitor of respective intersecting portions constitutes an intersection capacitor. If a capacitance due to a finger or a hand is present in the vicinity of the intersection capacitor, the mutual capacitance of a corresponding node is reduced by a composite capacitance due to the finger or hand. To determine which capacitor a variation of the mutual capacitance occurs at, the touch panel controller sequentially drives the drive electrodes with a pulse to perform a charging operation of a pulse unit, sequentially repeats an operation of detecting a variation in electric charges, which are charged, from the respective detection electrodes, and allows a detection circuit to acquire a signal in accordance with a variation in the mutual capacitance of the intersection capacitors, which are arranged in a matrix shape. The controller, which drives the touch panel by using the mutual capacitance method to detect a signal, is disclosed, for example, in JP-A-2012-234473.

JP-A-2012-234473 gives attention to a configuration in which a parasitic capacitive component is present in a route ranging from the intersection capacitor to the detection circuit, and deviation is present in the size of the parasitic capacitance component in accordance with the position or layout of the X electrodes. This deviation appears as a deviation in an amount of electric charges that are input to the detection circuit through the X electrodes. Therefore, as a calibration technique of correcting an effect due to the deviation, JP-A-2012-234473 suggests a technology of performing offset adjustment in correspondence with each intersection capacitor. That is, a calibration circuit that performs offset adjustment with respect to input signals or output signals of a plurality of detection circuits corresponding to a plurality of X electrodes of the touch panel, and a memory that stores adjustment parameters of the calibration circuit are provided in the touch panel controller. According to this, it is possible to adjust a deviation in non-touching detection data with high accuracy for each of the intersection capacitors of the touch panel. Accordingly, a detection voltage detected by the detection circuit enters into an input range of an A/D converter.

In addition, JP-A-2012-234473 describes how to cope with a case where an optimal value of the adjustment parameters varies due to a variation in an environment (ambient temperature, humidity). That is, two RAMs that store an adjustment parameter are provided to cope with the environmental variation, and one RAM is rewritten with an adjustment parameter corresponding to the environmental variation while using an adjustment parameter stored in the other RAM. After the rewriting is completed, the RAM to be used is changed.

SUMMARY

One example disclosed herein includes a touch detecting device. The touch detecting device includes a touch panel in which a plurality of Y electrodes and a plurality of X electrodes form a plurality of intersection capacitors and are arranged in a matrix shape. The touch detecting device also includes a touch panel controller configured to generate detection data corresponding to a capacitance distribution of the intersection capacitors. The touch detecting device further includes a processor configured to perform data processing based on the detection data. The touch panel controller includes a plurality of detection circuits, each detection circuit corresponding to a different X electrode. The touch panel controller also includes a calibration circuit configured to perform offset adjustment with respect to an input signal or an output signal of each of the detection circuits. The touch panel controller further includes a storage device configured to store first parameter data that specifies an offset adjustment operation of the calibration circuit, and second parameter data for correction of the first parameter data.

Another example provided herein includes a touch detecting device. The touch detecting device includes a touch panel in which a plurality of Y electrodes and a plurality of X electrodes form a plurality of intersection capacitors and are arranged in a matrix shape. The touch detecting device also includes a touch panel controller configured to generate detection data for each of the intersection capacitors. The touch detecting device further includes a processor configured to perform data processing based on the detection data. The touch panel controller includes a plurality of detection circuits, each detection circuit corresponding to a different X electrode. The touch panel controller also includes a calibration circuit configured to perform offset adjustment with respect to an input signal or an output signal of each of the detection circuits. The touch panel controller further includes a storage device that stores first parameter data, which specifies an offset adjustment operation of the calibration circuit. The touch panel controller also includes a control circuit. The processor is configured to perform control of calculating a correction value for correction of the first parameter data in a direction of canceling a corresponding variation and provide the first parameter data corrected with the calculated correction value to the storage device of the touch panel controller, upon determining that on the basis of the detection data transmitted from the touch panel controller for each of the interconnections of the X electrodes, detection data in non-touching exceeds a permissible range. The control circuit is configured to perform control of writing the first parameter data to the storage device at a timing that does not overlap with an operation of reading out the first parameter data from the storage device.

Another example provided herein includes a semiconductor device. The semiconductor device is configured to generate detection data corresponding to a capacitance distribution for each intersection capacitor formed between a plurality of Y electrodes and a plurality of X electrodes of a touch panel in which the plurality of Y electrodes and the plurality of X electrodes are arranged in a matrix shape. The semiconductor device includes a plurality of detection circuits, each detection circuit corresponding to a different X electrode. The semiconductor device also includes a calibration circuit configured to perform offset adjustment with respect to an input signal or an output signal of each of the detection circuits. The semiconductor device further includes a storage device configured to store first parameter data that specifies an offset adjustment operation of the calibration circuit, and second parameter data for correction of the first parameter data.

BRIEF DESCRIPTION OF THE DRAWINGS

FIG. 9 is a functional explanatory view of a control register value TPC_CALADJON;

FIG. 11 is an explanatory view illustrating a truth-value of calibration correction data CADJ_Data that is stored in a RAM for calibration correction data;

DETAILED DESCRIPTION

Introduction

Figure 1:
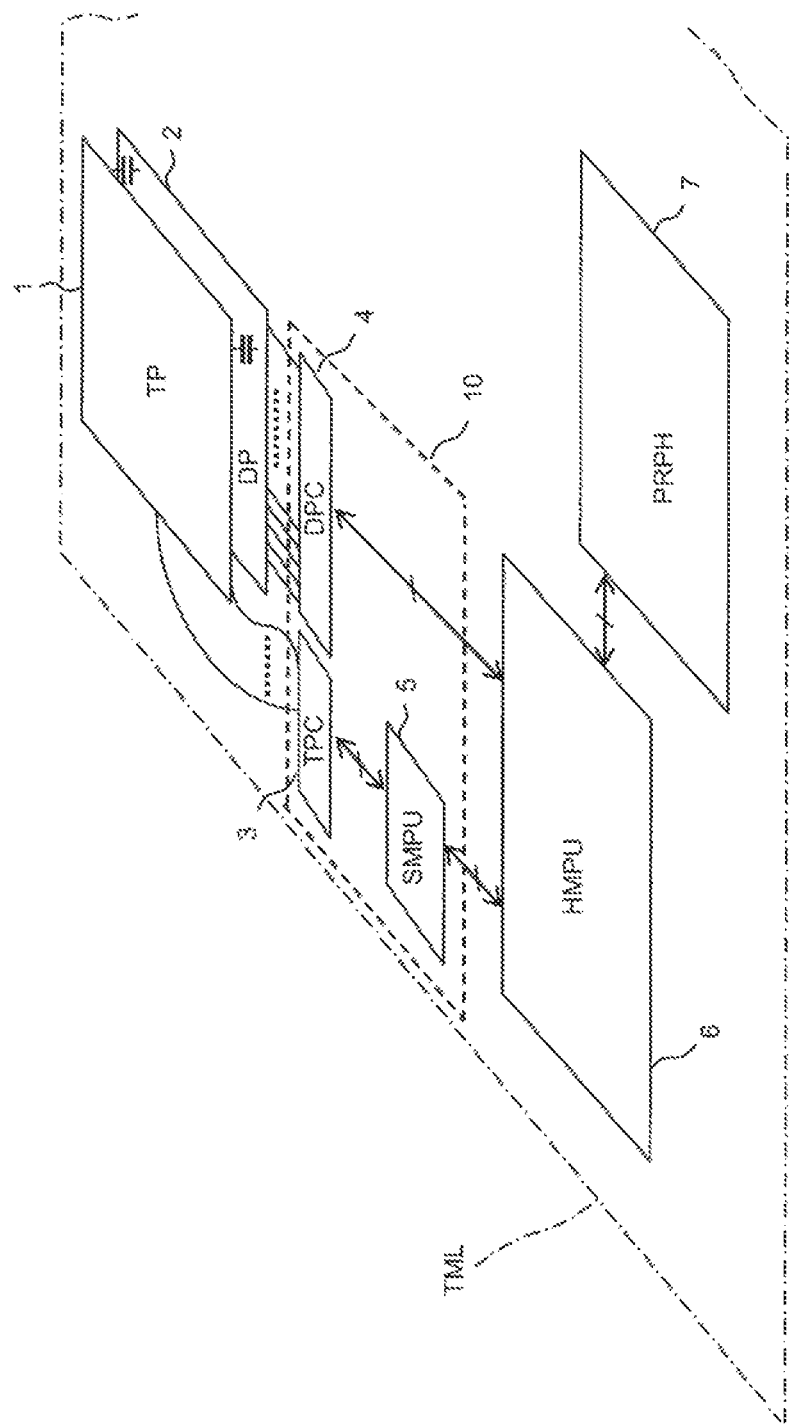
FIG. 1 is a block diagram illustrating an outline of a portable information terminal as an example of electronic equipment to which a touch panel is applied.

As disclosed in JP-A-2012-234473, in a configuration in which a plurality of RAMs, which store respective adjustment parameters, are provided to be used in an exclusive manner, the storage capacity of the RAMs is increased, and this increase leads to an increase in the circuit scale or the chip area. Second, touch detection is performed with an old adjustment parameter that is not optimal at a time period between calculation of a new adjustment parameter in accordance with the environmental variation and completion of the writing of the new parameter in the RAM, and thus there is a concern that erroneous touch determination may occur. To solve the problem of erroneous determination, the touch detection in the rewriting period is paused, and thus touch input operability deteriorates and inconvenience is caused. In this case, the configuration provided with two RAMs has no meaning. Third, the adjustment parameter itself is rewritten, and each adjustment parameter has a bit number appropriate for adjustment accuracy, and thus not a few times are used for rewriting. Therefore, the concern relating to the erroneous touch determination increases, and a pause period of the touch detection is apt to increase.

An advantage of the invention is to provide a touch detecting device which is capable of optimizing an adjustment parameter for adjustment of deviation in non-touching detection data for each intersection capacitor of a touch panel in correspondence with an environmental variation, in which touch detection may not be paused during the optimization, and which is capable of preventing a concern relating to erroneous touch determination in advance.

In addition, another advantage of the invention is to provide a semiconductor device that is suitable for the touch detecting device.

The above and other advantages and new features of the present invention will be more apparent from the following description of this specification and the attached drawings.

Summary of a representative embodiment among embodiments disclosed in this application can be briefly described as follows.

Specifically, a touch panel controller is provided with a calibration circuit which performs offset adjustment with respect to input signals of a plurality of detection circuits corresponding to a plurality of X electrodes of a touch panel, and a storage device which stores first parameter data that specifies an offset adjustment operation of the calibration circuit and second parameter data for correction for the first parameter data.

An effect obtained by the representative embodiment among embodiments disclosed in this application can be briefly described as follows.

Specifically, since the second parameter data for correction of the first parameter data in relation to an environmental variation in a temperature and the like is provided, it is possible to easily perform offset adjustment of the calibration circuit with high accuracy without pausing a detection operation in the middle of the adjustment.

1. Summary of the Embodiments

First, summary of representative embodiments of the invention disclosed in the application will be described. Reference numerals in drawings in parentheses referred to in description of the summary of the representative embodiments just denote components included in the concept of the components to which the reference numerals are designated.

[1] Correction Data of Offset Adjustment Parameter

A touch detecting device (TML) includes a touch panel (1) in which a plurality of Y electrodes (Ym (Y1 to YM)) and a plurality of X electrodes (Xn (X1 to YN)) are arranged in a matrix shape, a touch panel controller (3, 3A, 3C) that generates detection data corresponding to a capacitance distribution for each of intersections between the Y electrodes and the X electrodes on the basis of a signal shown in the X electrodes in correspondence with an intersection capacitor between the Y electrodes and the X electrodes of the touch panel, and a processor (5) that performs data processing by using the detection data that is transmitted from the touch panel controller. The touch panel controller includes a plurality of detection circuits which correspond to the plurality of X electrodes, a calibration circuit (304) that performs offset adjustment with respect to an input signal or an output signal of each of the detection circuits, and a storage device (307, 308, 322) that stores first parameter data (C_Data) that specifies an offset adjustment operation of the calibration circuit, and second parameter data (CADJ_Data) for correction for the first parameter data.

According to this, since the touch panel controller includes the storage device that stores the second parameter data configured to correct the first parameter data, which is configured to adjust a deviation in detection data for each of the intersection capacitors of the touch panel, as desired, it is not necessary to stop a touch detection operation with respect to an environmental variation and to rewrite a first parameter data set. In addition, it is not necessary to prepare a plurality of storage devices that store the first parameter data set. In addition, a configuration, in which the parameter data for the offset adjustment is corrected by the second parameter data, is employed, and thus when a correction interval is set to be small, it is easy to realize optimization of the second parameter data in a dynamic manner with respect to the environmental variation.

[2] Correction Data for Each Interconnection Between Y Electrode and X Electrode In the touch detecting device according to [1], the first parameter data is data (C_Data[y1, x1] to C_Data[yM, xN]) for each of the intersections between the Y electrodes and the X electrodes. The second parameter data is data (CADJ_Data[y1, x1] to CADJ_Data[yM, xN]) for each of the intersections between the Y electrodes and the X electrodes (refer to FIG. 8).

According to this, it is possible to perform correction of the parameter data for each of the intersections between the Y electrodes and the X electrodes, and thus high offset adjustment accuracy by correction can be maintained.

[3] Representative Correction Data for Intersection Between Y Electrode and X Electrode In the touch detecting device according to [1], the first parameter data is data (C_Data[y1, x1] to C_Data[yM, xN]) for each of the intersections between the Y electrodes and the X electrodes. The second parameter data is representative data (CADJ_Data[7:0]) that is represented by a single piece of data or a plurality of pieces of data with respect to the intersections between the Y electrodes and the X electrodes (refer to FIG. 17, FIG. 23).

According to this, the offset adjustment accuracy by correction decreases, but it is possible to suppress an increase in the circuit scale of the storage device due to storage of the second parameter data.

[4] Memory Individually Storing First Parameter Data and Second Parameter Data

In the touch detecting device according to [2], the storage device includes a first memory (307) that stores the first parameter data, and a second memory (308) that stores the second parameter data. The second parameter data, which is provided from the processor, is stored in the second memory.

According to this, it is possible to easily manage the second parameter data, which has a characteristic different from that of the first parameter data with a processor, by separating the second parameter data from the first parameter data.

[5] Stores Representative Data in Register as Second Parameter Data

In the touch detecting device according to [3], the storage device includes a first memory (307) that stores the first parameter data, and a parameter register (322) that stores the representative data as the second parameter data. The representative data, which is provided from the processor, is stored in the parameter register.

According to this, it is possible to easily manage representative data as second parameter data, which has characteristics different from that of first parameter data with a processor, by separating the second parameter data from the first parameter data.

[6] Acquisition of Parameter Data by Calibration Circuit Whenever Y Electrode is Switched In the touch detecting device according to [1], the touch panel controller includes a drive circuit (300) that supplies a pulse signal to the plurality of Y electrodes in an electrode arrangement order to drive the Y electrodes. The detection circuit detects a capacitance value of each of the intersection capacitors between the Y electrodes and the X electrodes, which intersect each other, in a unit of the Y electrode that is driven. Whenever the Y electrode, to which the pulse signal is applied, is switched, the calibration circuit inputs the corresponding first parameter data before or after correction.

According to this, reading-out and transmission control of the first parameter data and the second parameter data may be performed in synchronization with the switching of the Y electrode.

[7] Correction by Addition or Subtraction

In the touch detecting device according to [1], the second parameter data is data that is added to or subtracted from the first parameter data, and desired correction is performed by adding or subtracting the second parameter data to or from the first parameter data.

According to this, it is possible to perform correction of the first parameter data with the second parameter data in a simple manner, and it is possible to easily reduce a bit number of the second parameter data in comparison to the first parameter data.

[8] Calibration with Amount of Current of Constant Current Source

In the touch detecting device according to [7], the calibration circuit is a circuit that adjusts an amount of current of a constant current source ($340\_n$), which is coupled to an input of the detection circuit, with the first parameter data before or after correction.

According to this, it is possible to easily adjust the offset by controlling the amount of current from the constant current source with respect to the input of the detection circuit.

[9] Calibration with Movement Amount of Electric Charge

In the touch detecting device according to [7], the calibration circuit is a circuit that adjusts an amount of electric charges, which are applied to an input of the detection circuit through a capacitive element ($341\_n$) coupled to the input, with the first parameter data before or after correction.

According to this, it is possible to easily adjust the offset by controlling a capacitive coupling voltage with respect to an input node of the detection circuit.

[10] Calibration with Addition or Subtraction Amount of Voltage in Accordance with Adjustment Parameter In the touch detecting device according to [7], the calibration circuit is a circuit that adjusts an addition or subtraction amount of voltage, which is applied through an addition and subtraction circuit ($350\_n$) coupled to an output of the detection circuit, with the first parameter data before or after correction.

According to this, it is possible to easily adjust the offset by addition and subtraction control of a voltage with respect to the output of the detection circuit.

[11] Mode Register

In the touch detecting device according to [7], the touch panel controller includes a mode register (321), which designates a first mode allowing the calibration circuit to operate on the basis of the first parameter data before correction, and a second mode allowing the calibration circuit to operate on the basis of third parameter data obtained by correcting the first parameter data with the second parameter data, in a switchable manner. Setting with respect to the mode register is performed by the processor.

According to this, it is possible to freely control whether or not to correct the first parameter data with respect to the environmental variation with the processor.

Figure 10:
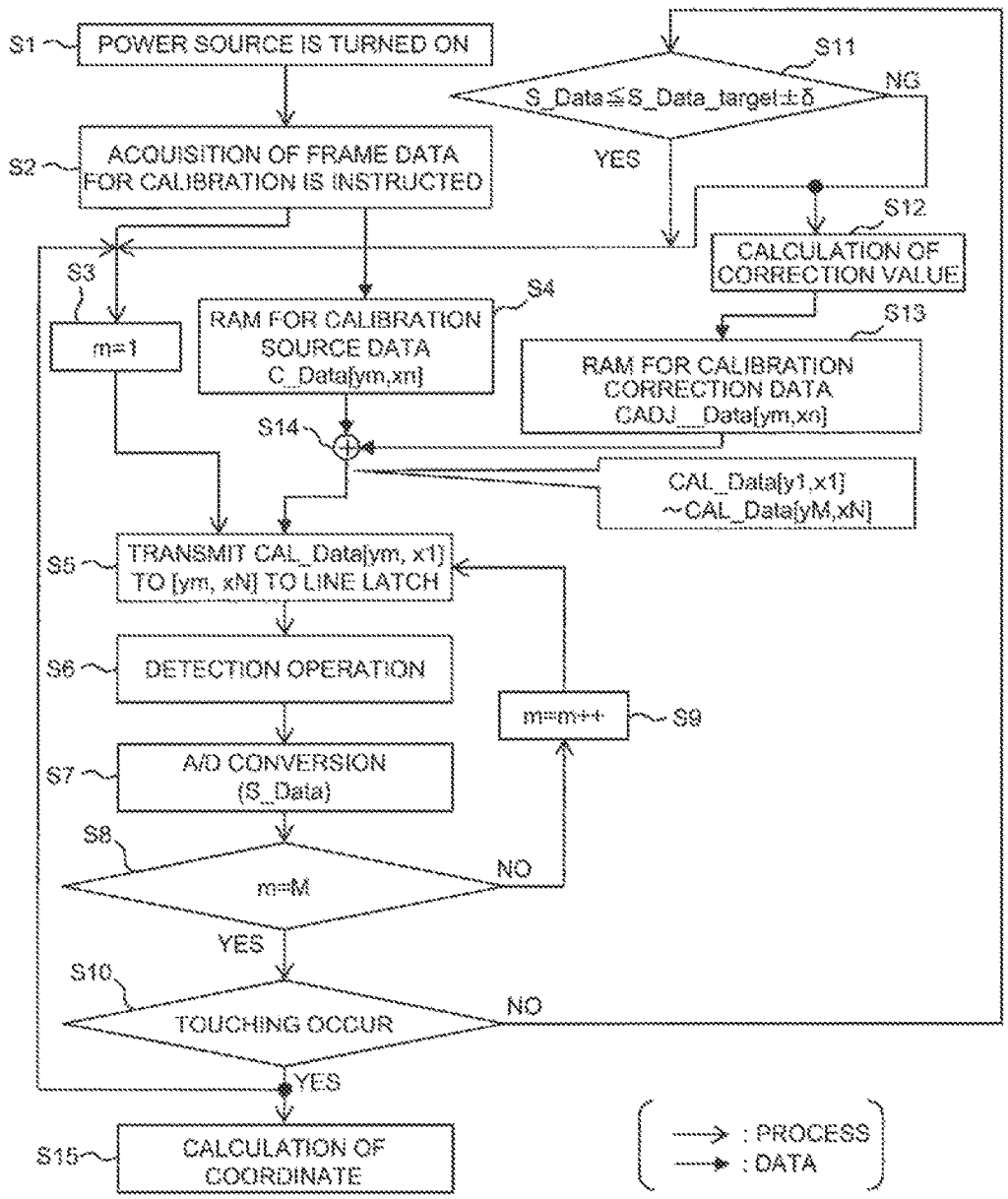
FIG. 10 is a flowchart illustrating generation of calibration data capable of coping with an environmental variation, and a touch detection operation using the calibration data.
Figure 18:
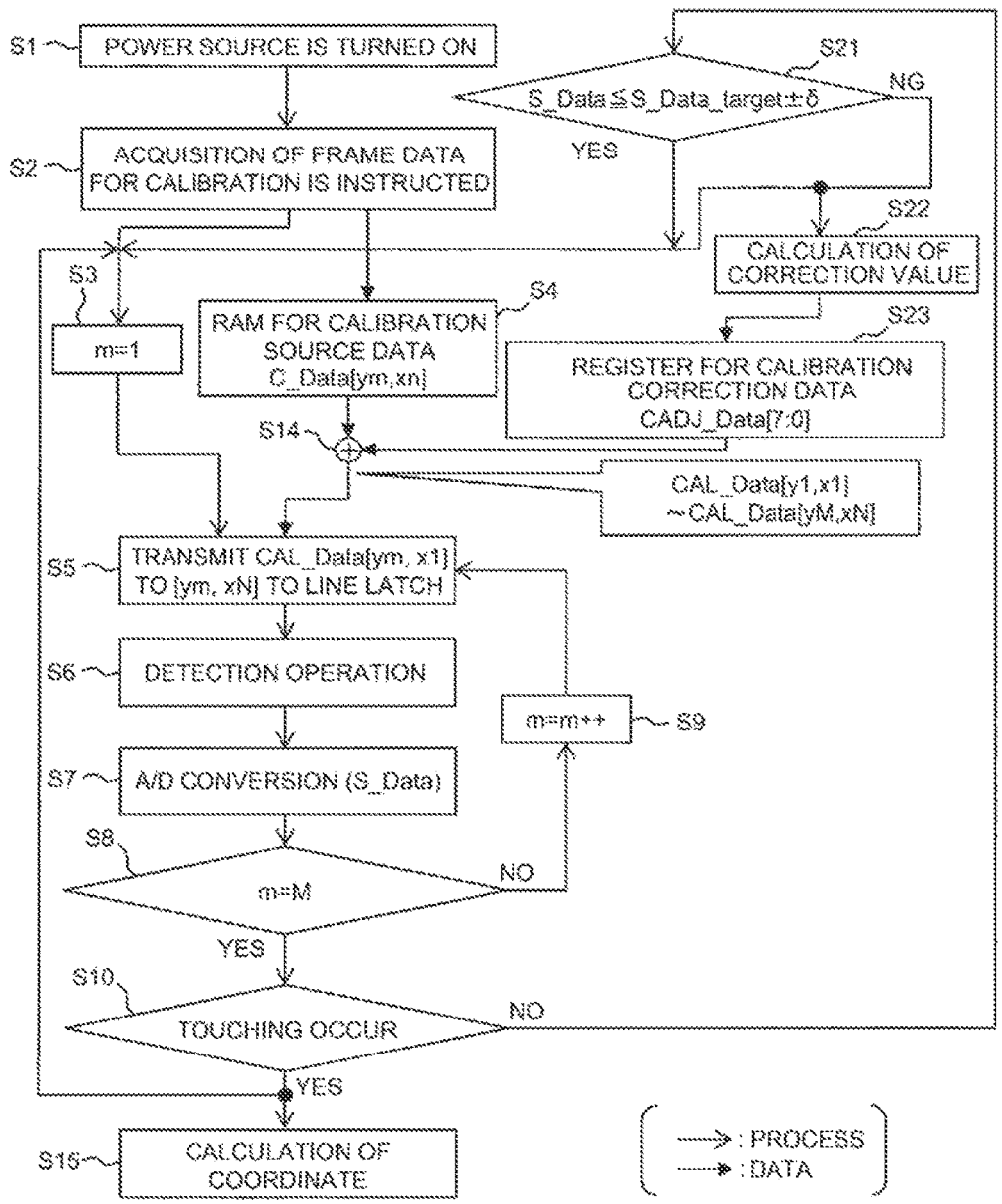
FIG. 18 is a flowchart illustrating generation of calibration data capable of coping with the environmental variation and a touch detection operation using the calibration data in the second embodiment.

[12] Calculation of Value of Second Parameter Data on the Basis of Detection Data In the touch detecting device according to [1], in a case where it is determined that on the basis of the detection data transmitted from the touch panel controller for each of the interconnections of the X electrodes, detection data in non-touching exceeds a permissible range, the processor performs control of calculating the second parameter data that is a value for correction of the first parameter data in a direction of cancelling a corresponding variation, and providing the calculated second parameter data to the storage device of the touch panel controller (refer to FIG. 10, FIG. 18).

According to this, it is possible to use second parameter data that is calculated in consideration of the environmental variation.

Figure 21:
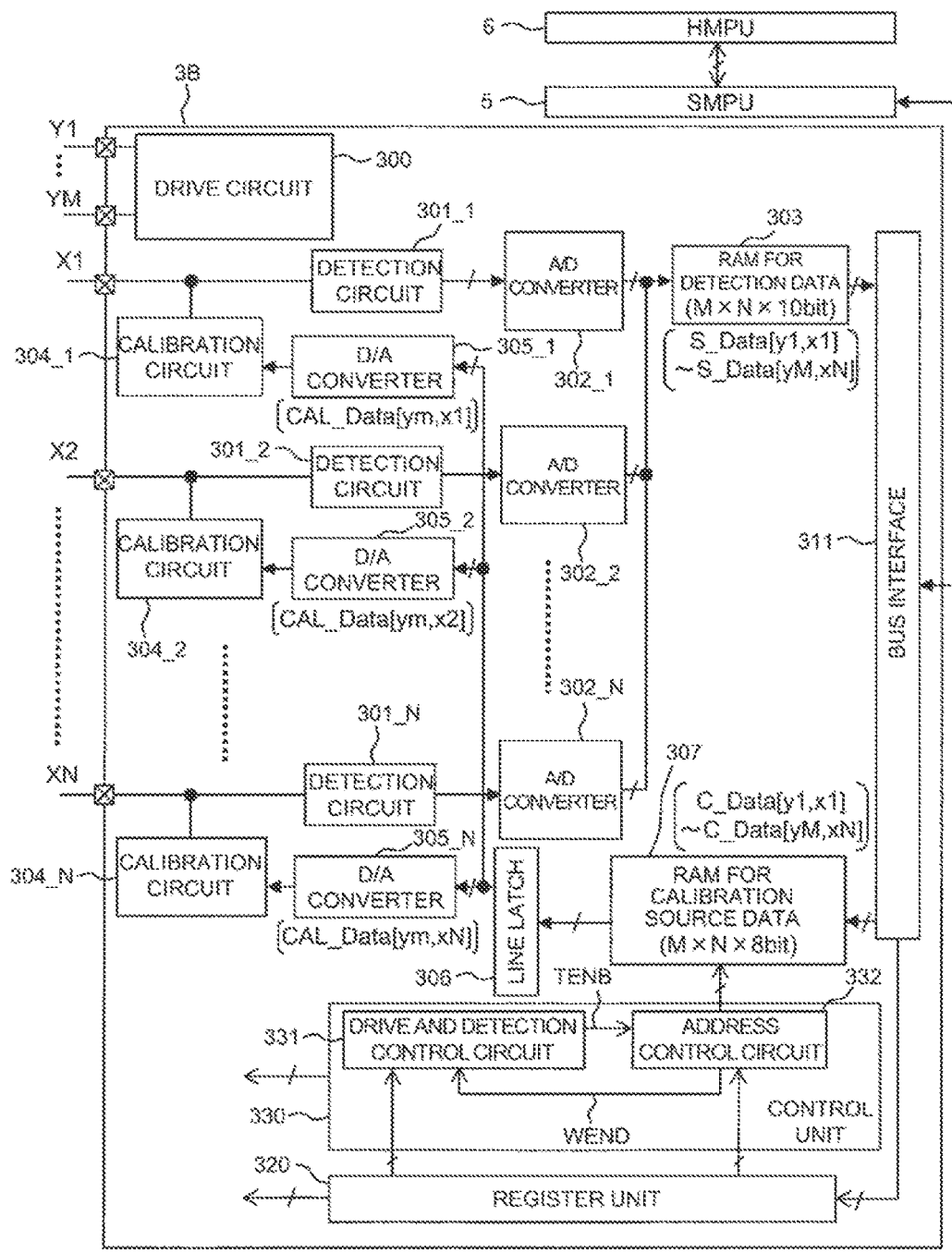
FIG. 21 is a block diagram illustrating a touch panel controller which generates calibration data corresponding to the environmental variation according to a third embodiment.

[13] Selection of Value of Second Parameter Data in Accordance with Detection Result of Environmental Variation In the touch detecting device according to [1], the processor performs control of selecting a value of the second parameter data, which is used to correct the first parameter data, on the basis of a detection result with respect to a variation in environment in which the touch detecting device is placed, and providing the selected second parameter data to the storage device of the touch panel controller (refer to FIG. 21).

According to this, second parameter data, which corresponds to an environmental variation assumed in advance, can be selected on the basis of a detection result of the environmental variation, and thus it is possible to reduce the second parameter data calculating load in the processor.

[14] Rewriting of Offset Adjustment Parameter

Another touch detecting device (3B) includes a touch panel (1) in which a plurality of Y electrodes and a plurality of X electrodes are arranged in a matrix shape, a touch panel controller (3) that generates detection data for each of intersections between the Y electrodes and the X electrodes on the basis of a signal shown in the X electrodes in correspondence with an intersection capacitor between the Y electrodes and the X electrodes of the touch panel, and a processor (5) that performs data processing by using the detection data that is transmitted from the touch panel controller. The touch panel controller includes a plurality of detection circuits (301) which correspond to the plurality of X electrodes, a calibration circuit (304) that performs offset adjustment with respect to an input signal or an output signal of each of the detection circuits, a storage device (307) that stores first parameter data (C_Data), which specifies an offset adjustment operation of the calibration circuit, in correspondence with the respective intersection capacitors, and a control circuit (330). In a case where it is determined that on the basis of the detection data transmitted from the touch panel controller for each of the interconnections of the X electrodes, detection data in non-touching exceeds a permissible range, the processor performs control of calculating a correction value for correction of the first parameter data in a direction of cancelling a corresponding variation, and providing the first parameter data corrected with the calculated correction value in the storage device of the touch panel controller. The control circuit performs control of writing the first parameter data in the storage device at a timing not overlapping an operation of reading out the first parameter data from the storage device.

According to this, it is possible to set a relatively long period of time before the first parameter data that is a correction target is used next as a correction processing time, and thus it is possible to sequentially perform a process of correcting the first parameter data on the basis of the detected detection data with a temporal margin. Accordingly, it is possible to make the first parameter data follow the environmental variation in a dynamic manner. In addition, the access control to the storage device is performed in such a manner that reading-out and writing-in of the first parameter data do not overlap each other, and thus, in advance, it is possible to prevent a problem that the corrected first parameter data is read out from the storage device during writing of the corrected first parameter data.

[15] Acquisition of Parameter Data by Calibration Circuit Whenever Y Electrode is Switched The touch detecting device according to [14] further includes a drive circuit that supplies a pulse signal to the plurality of Y electrodes in an electrode arrangement order to drive the Y electrodes. The detection circuit detects a capacitance value of each of the intersection capacitors between the Y electrodes and the X electrodes, which intersect each other, in a unit of the Y electrode that is driven. Whenever the Y electrode, to which the pulse signal is applied, is switched, the calibration circuit inputs the corresponding first parameter data before or after correction.

According to this, reading-out and transmission control of the first parameter data may be performed in synchronization with the switching of the Y electrode.

[16] Rewriting Cycle of Offset Adjustment Parameter

In the touch detecting device according to [15], the touch panel controller sequentially drives the plurality of Y electrodes, and provides the detection data to the processor in a drive unit of the Y electrode. The processor performs control of providing the corresponding first parameter data after correction, which is calculated on the basis of the provided detection data, to the storage device of the touch panel controller at a timing before the Y electrode for acquisition of the detection data is driven the next time (refer to FIG. 21, FIG. 22).

According to this, time taken to complete a switching cycle of the Y electrodes may be set to a processing time of correction and rewriting of a group of first parameter data in accordance with the drive unit of the Y electrodes.

[17] Calibration with Amount of Current of Constant Current Source

In the touch detecting device according to [14], the calibration circuit is a circuit that adjusts an amount of current of a constant current source (340_$n$), which is coupled to an input of the detection circuit, with the first parameter data.

According to this, it is possible to easily adjust the offset by controlling the amount of current from the constant current source with respect to the input of the detection circuit.

[18] Calibration with Movement Amount of Electric Charge

In the touch detecting device according to [14], the calibration circuit is a circuit that adjusts an amount of electric charges, which are applied to an input of the detection circuit through a capacitive element (341_$n$) coupled to the input, with the first parameter data.

According to this, it is possible to easily adjust the offset by controlling a capacitive coupling voltage with respect to an input node of the detection circuit.

[19] Calibration with Addition or Subtraction Amount of Voltage in Correspondence with Adjustment Parameter In the touch detecting device according to [14], the calibration circuit is a circuit that adjusts an addition or subtraction amount of voltage that is applied through an addition and subtraction circuit (350_$n$) coupled to an output of the detection circuit, with the first parameter data.

According to this, it is possible to easily adjust the offset by addition and subtraction control of a voltage with respect to the output of the detection circuit.

[20] Correction Data of Offset Adjustment Parameter

A semiconductor device (10) generates detection data corresponding to a capacitance distribution for each of the intersections between a plurality of Y electrodes and a plurality of X electrodes on the basis of a signal shown in the X electrodes in correspondence with an intersection capacitor between the plurality of Y electrodes and the plurality of X electrodes of a touch panel in which the plurality of Y electrodes and the plurality of X electrodes are arranged in a matrix shape. The semiconductor device includes a plurality of detection circuits (301) which correspond to the plurality of X electrodes, a calibration circuit (304) that performs offset adjustment with respect to an input signal or an output signal of each of the detection circuits, and a storage device (307, 308, 322) that stores first parameter data that specifies an offset adjustment operation of the calibration circuit, and second parameter data for correction for the first parameter data.

According to this, since the touch panel controller includes the storage device that stores the second parameter data configured to correct the first parameter data, which is configured to adjust a deviation in detection data for each of the intersection capacitors of the touch panel, as desired, it is not necessary to stop a touch detection operation with respect to a variation in a signal generation environment of the detection signal and to rewrite a first parameter data set. In addition, it is not necessary to prepare a plurality of storage devices that store the first parameter data set. In addition, a configuration, in which the parameter data for the offset adjustment is corrected by the second parameter data, is employed, and thus when a correction interval is set to be small, it is easy to realize optimization of the second parameter data in a dynamic manner with respect to the environmental variation. This semiconductor device is suitable for a use in a touch detecting device that optimizes an adjustment parameter configured to adjust a deviation in non-touching detection data for each intersection capacitor of the touch panel in accordance with an environmental variation.

[21] Correction Data for Each Interconnection Between Y Electrode and X Electrode In the semiconductor device according to [20], the first parameter data is data (C_Data[y1, x1] to C_Data[yM, xN]) for each of the intersections between the Y electrodes and the X electrodes. The second parameter data is data (CADJ_Data[y1, x1] to CADJ_Data[yM, xN]) for each of the intersections between the Y electrodes and the X electrodes (refer to FIG. 8).

According to this, it is possible to perform correction of the parameter data for each of the intersections between the Y electrodes and the X electrodes, and thus high offset adjustment accuracy by correction can be maintained.

[22] Representative Correction Data for Intersection Between Y Electrode and X Electrode In the semiconductor device according to [20], the first parameter data is data (C_Data[y1, x1] to C_Data[yM, xN]) for each of the intersections between the Y electrodes and the X electrodes. The second parameter data is representative data (CADJ_Data[7:0]) that is represented by a single piece of data or a plurality of pieces of data with respect to the intersections between the Y electrodes and the X electrodes (refer to FIG. 17, FIG. 23).

According to this, the offset adjustment accuracy by correction decreases, however, it is possible to suppress an increase in the circuit scale of the storage device due to storage of the second parameter data.

[23] Acquisition of Parameter Data by Calibration Circuit Whenever Y Electrode is Switched In the semiconductor device according to [20], the touch panel controller includes a drive circuit (300) that supplies a pulse signal to the plurality of Y electrodes in an electrode arrangement order to drive the Y electrodes. The detection circuit detects a capacitance value of each of the intersection capacitors between the Y electrodes and the X electrodes, which intersect each other, in a unit of the Y electrode that is driven. Whenever the Y electrode, to which the pulse signal is applied, is switched, the calibration circuit inputs the corresponding first parameter data before or after correction.

According to this, reading-out and transmission control of the first parameter data and the second parameter data may be performed in synchronization with the switching of the Y electrode.

[24] Correction by Addition or Subtraction

In the semiconductor device according to [20], the second parameter data is data that is added to or subtracted from the first parameter data, and desired correction is performed by adding or subtracting the second parameter data to or from the first parameter data.

According to this, it is possible to perform correction of the first parameter data with the second parameter data in a simple manner, and it is possible to easily reduce the bit number of the second parameter data in comparison to the first parameter data.

[25] Calibration with Amount of Current of Constant Current Source

In the semiconductor device according to [24], the calibration circuit is a circuit that adjusts an amount of current of a constant current source (340_$n$), which is coupled to an input of the detection circuit, with the first parameter data before or after correction.

According to this, it is possible to easily adjust the offset by controlling the amount of current from the constant current source with respect to the input of the detection circuit.

[26] Calibration with Movement Amount of Electric Charge

In the semiconductor device according to [25], the calibration circuit is a circuit that adjusts an amount of electric charges, which are applied to an input of the detection circuit through a capacitive element (341_$n$) coupled to the input, with the first parameter data before or after correction.

According to this, it is possible to easily adjust the offset by controlling a capacitive coupling voltage with respect to an input node of the detection circuit.

[27] Calibration with Addition or Subtraction Amount of Voltage in Correspondence with Adjustment Parameter In the semiconductor device according to [25], the calibration circuit is a circuit that adjusts an addition or subtraction amount of voltage that is applied through an addition and subtraction circuit (350_$n$) coupled to an output of the detection circuit, with the first parameter data before or after correction.

According to this, it is possible to easily adjust the offset by addition and subtraction control of a voltage with respect to the output of the detection circuit.

[28] Mode Register

In the semiconductor device according to [24], the touch panel controller includes a mode register (321), which designates a first mode allowing the calibration circuit to operate on the basis of the first parameter data before correction, and a second mode allowing the calibration circuit to operate on the basis of third parameter data obtained by correcting the first parameter data with the second parameter data, in a switchable manner. Setting with respect to the mode register is performed by the processor.

According to this, it is possible to freely control whether or not to correct the first parameter data with respect to the environmental variation with the processor.

[29] Processor is Embedded

The semiconductor device according to [20] further includes a processor that performs data processing by using the detection data that is transmitted from the touch panel controller.

According to this, it is possible to contribute to realization of high-speed processing and miniaturization of an application system such as a touch detecting device.

[30] Calculation of Value of Second Parameter Data on the Basis of Detection Data In the semiconductor device according to [29], in a case where it is determined that on the basis of the detection data transmitted from the touch panel controller for each of the interconnections of the X electrodes, detection data in non-touching exceeds a permissible range, the processor performs control of calculating the second parameter data that is a value for correction of the first parameter data in a direction of cancelling a corresponding variation, and providing the calculated second parameter data to the storage device of the touch panel controller (refer to FIG. 10, FIG. 18).

According to this, it is possible to use second parameter data that is calculated in consideration of the environmental variation.

[31] Selection of Value of Second Parameter Data in Accordance with Detection Result of Environmental Variation In the semiconductor device according to [29], the processor performs control of selecting a value of the second parameter data, which is used to correct the first parameter data, on the basis of a detection result with respect to a variation in environment in which the touch detecting device is placed, and providing the selected second parameter data to the storage device of the touch panel controller (refer to FIG. 21).

According to this, second parameter data, which corresponds to an environmental variation assumed in advance, can be selected on the basis of a detection result of the environmental variation, and thus it is possible to reduce a second parameter data calculating load in the processor.

2. Further Detailed Description of the Embodiments

Embodiments will be described in more detail.

Electronic Equipment to which Touch Panel is Applied

FIG. 1 illustrates an outline of a portable information terminal as an example of electronic equipment to which a touch panel is applied.

The portable information terminal TML shown in the same drawing includes a touch panel (TP) 1, a display panel (DP) 2, a touch panel controller (TPC) 3, a display controller (DPC) 4, a sub-processor (SMPU) 5, a host processor (HMPU) 6, and peripheral device (PRPH) 7. Here, the touch panel controller 3, the display controller 4, and the sub-processor 5 are formed in one semiconductor chip, for example, through CMOS integrated circuit manufacturing technology, and constitute a one-chip semiconductor device 10A. A range of one semiconductor device is not limited thereto. For example, the touch panel controller 3 and the sub-process 5 may be formed in one semiconductor chip to constitute a semiconductor device, and the display controller 4 may be configured as a separate chip. This configuration has the following advantage. That is, in a case where specifications of the display controller 4 are changed and detection specifications of the touch panel do not vary, it is possible to easily constitute a touch panel system with new specifications by changing one chip of the display controller 4. At this time, the semiconductor device receives synchronization signal for display such as Hsync and Vsync from the display controller 4. In addition, the touch panel controller 3 and the display controller 4 may be formed in one semiconductor chip to constitute a semiconductor device, and the sub-processor 5 may be configured as a separate chip. This configuration is suitable for a case of designing plural-generation products by using software that is constructed on the sub-processor 5. That is, it is possible to separate functions of a semiconductor device so that hardware design for liquid crystal display and touch detection, and software design by using touch detection results can be individually developed. Although not specifically shown, the touch panel controller 3, the display controller 4, and the sub-processor 5 may be separately formed in individual semiconductor chips.

For example, in the display panel 2, pixels by a transparent electrode and liquid crystal are formed in correspondence with the display scale on a glass substrate. Although not particularly limited, the touch panel 1 has an in-cell structure in which the touch panel 1 is integrally formed on a surface of the display panel. A plurality of drive electrodes (Y electrodes) and a plurality of detection electrodes (X electrodes) are arranged to intersect each other through a dielectric, thereby constituting a so-called mutual capacitance type touch panel.

The touch panel controller 3 sequentially supplies a drive pulse to the drive electrodes, periodically integrates signals that appear in the detection electrodes through capacitive components between the drive electrodes and the detection electrodes of the touch panel 1, and generates detection data corresponding to the capacitive components. The detection data is data corresponding to a capacitance distribution for each of the intersections between the Y electrodes and the X electrodes.

The sub-processor 5 that is a processor for a sub-system controls initial settings or an operation mode with respect to the touch panel controller 3. In addition, the sub-processor 5 performs calculation of a touch position which a finger and the like approaches, and evaluation of external noise, and the like on the basis of the detection data that is acquired by the touch panel controller 3. The sub-processor 5 is an example of a data processor. The sub-processor 5 or the host processor 6 is a program processing device provided with a central processing unit (CPU) and a peripheral circuit thereof.

The host processor 6 plays a roll of performing overall control of a portable information terminal. For example, when the host processor 6 generates display data as an example of display control, the display controller 4 receives the display data and supplies a display signal corresponding to the display data to the display panel 2 in synchronization with a display timing. In addition, the host processor 6 receives position coordinates calculated by the sub-processor 5, and analyzes manipulation with respect to the touch panel 1 from a relationship between a display content and position coordinates at that time to perform control in response to a corresponding input.

In addition, as the peripheral circuit 7, a communication control unit, an image processing unit, a voice processing unit, an accelerator for data processing, and the like, which are for a portable information terminal, are provided.

Figure 2:
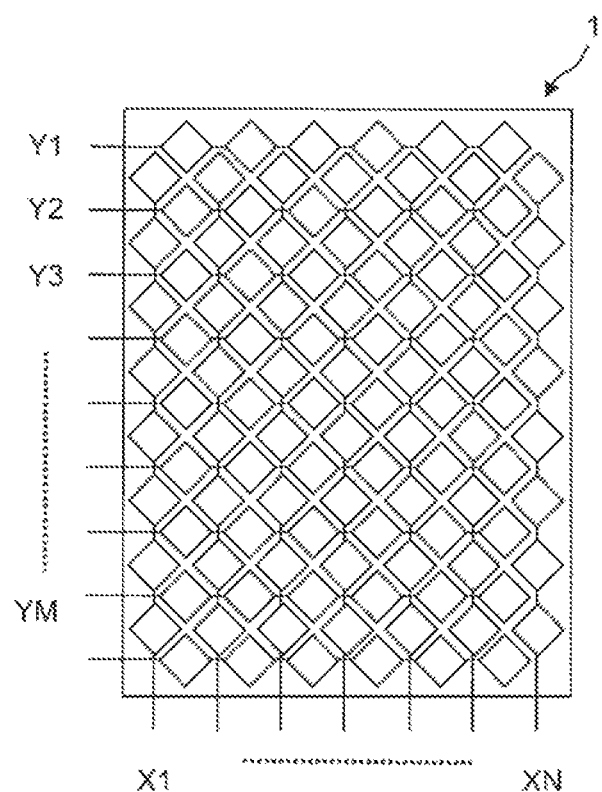
FIG. 2 is an explanatory view illustrating an electrode configuration of the touch panel.

FIG. 2 illustrates an electrode configuration of the touch panel 1. In the touch panel 1, a plurality of drive electrodes (Y electrodes) Y1 to YM which are formed in a horizontal direction and a plurality of detection electrodes (X electrodes) X1 to XN which are formed in a vertical direction are arranged in a state of being electrically insulated. Although not particularly limited, a plurality of rectangular electrodes are formed for each of the electrodes in the middle of an extension direction thereof, and an intersection capacitor is formed between adjacent rectangular electrodes that are electrically insulated. When an object such as a finger, which is electrically connected to a global ground, approaches the intersection capacitor, a stray capacitance accompanying the approach is added to a capacitance value of the intersection capacitor, and thus a capacitive component (composed capacitive component) between the electrodes becomes smaller than the capacitance value of the intersection capacitor. A signal difference corresponding to a difference in the capacitive component appears in the detection data that is generated by the touch panel controller 3.

Although not particularly shown, in the display panel 2, a plurality of gate electrodes formed in a horizontal direction as a scanning electrode, and a plurality of drain electrodes formed in a vertical direction as a signal electrode are arranged in the display panel 2. In addition, a selection terminal is connected to a corresponding scanning electrode at each of intersections between the gate electrodes and the drain electrodes, and a plurality of display cells (sub-pixels), in which each input terminal is connected to a corresponding signal electrode, are arranged. For example, the display controller 4 controls a sequential operation (scanning operation of a display line) of the gate electrodes in one frame display period specified with a vertical synchronization signal, and provides a grayscale signal (display signal) to the drain electrodes for each operation of the gate electrodes, thereby controlling the transmittance of liquid crystal elements of sub-pixels in a unit of display line.

Figure 3:
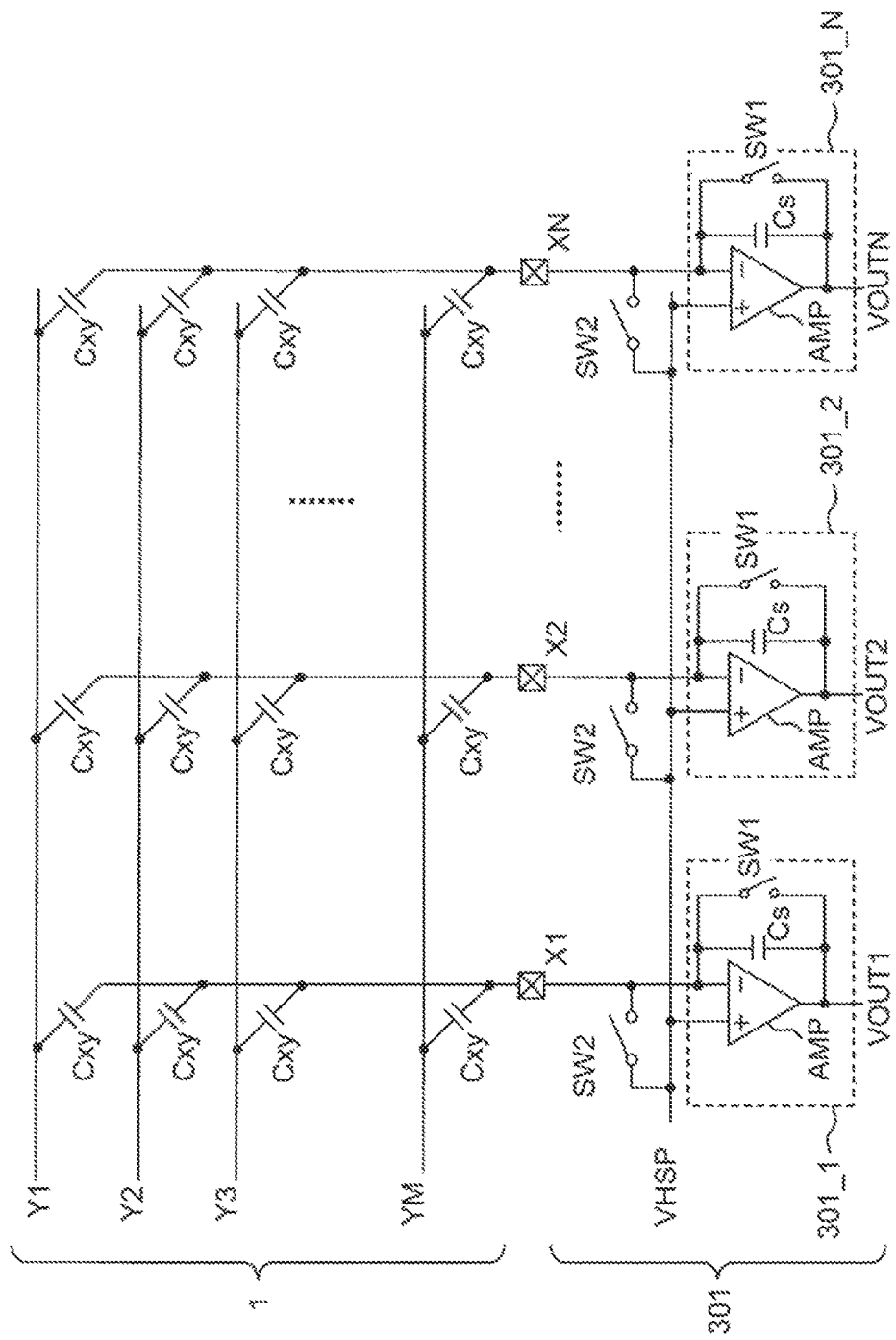
FIG. 3 is a circuit diagram illustrating an equivalent circuit of the touch panel and an integration circuit that is an example of a detection circuit.

FIG. 3 illustrates an equivalent circuit of the touch panel 1 and an example of integration circuits 301 (301_1 to 301_N) as an example of a detection circuit. The Y electrodes Y1 to YM and the X electrodes X1 to XN are arranged in a matrix shape in the touch panel 1, and an intersection capacitor formed at each intersection therebetween is shown as Cxy.

For example, each of the integration circuits 301 is constituted by a pre-charge voltage VHSP for charging the X electrodes X1 to XN, a switch SW2 that selectively applies the voltage VHSP as a pre-charge voltage to the X electrodes X1 to XN, an operational amplifier AMP to which the voltage VHSP as a reference voltage is applied to a non-inverting input terminal (+), and to which a corresponding X electrode is connected to an inverting input terminal (−), an integration capacitor Cs that is disposed between the inverting input terminal (−) and an output terminal of the operational amplifier AMP, and a switch SW1 that resets the integration capacitor Cs. The switch SW1 resets an electric charge accumulated in a capacitor Cs that is used for detection. Although not particularly limited, the switch SW2 enters an off-state in a pulse drive period of the Y electrodes Y1 to YM.

Figure 4:
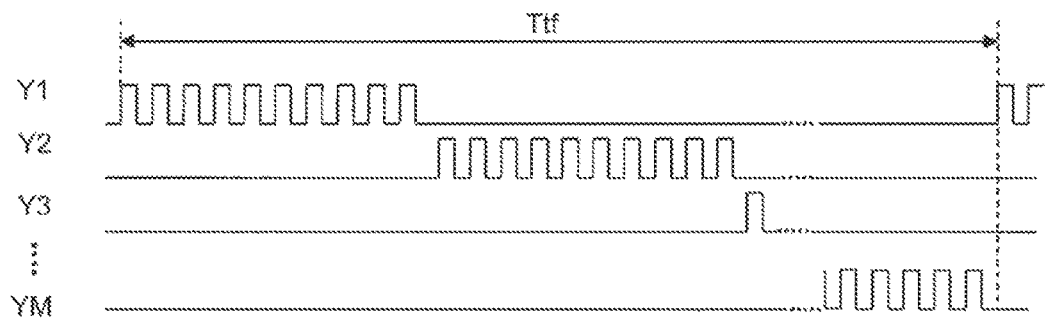
FIG. 4 is a waveform diagram illustrating a signal waveform of a drive pulse signal that is supplied to a Y electrode.

FIG. 4 illustrates an example of a signal waveform of a drive pulse signal that is supplied to the Y electrodes Y1 to YM. For example, a plurality of drive pulses are supplied to the Y electrodes Y1 to YM in an electrode arrangement order. An example in which 10 drive pulses are supplied with a predetermined pulse width and at a predetermined pulse cycle for each one of the Y electrodes, is illustrated for convenience. A period for pulse-driving one of the Y electrodes a plurality of times corresponds to a period (period for a plurality of times of display scanning) for sequentially scanning-driving a plurality of display lines of the display panel. For example, when the Y electrodes of the touch panel are pulse-driven two times in one display scanning period that synchronizes with the horizontal synchronization signal of the display panel, if the number of times of pulse-driving one Y electrode is set to 10, an integration operation is performed by pulse-driving one Y electrode 10 times in a display period of five display lines. Detection sensitivity can be increased by an integration operation by a plurality of times of pulse-driving. Ttf becomes a touch detection period of one time with respect to the entire surface of the touch panel 1.

Figure 5:
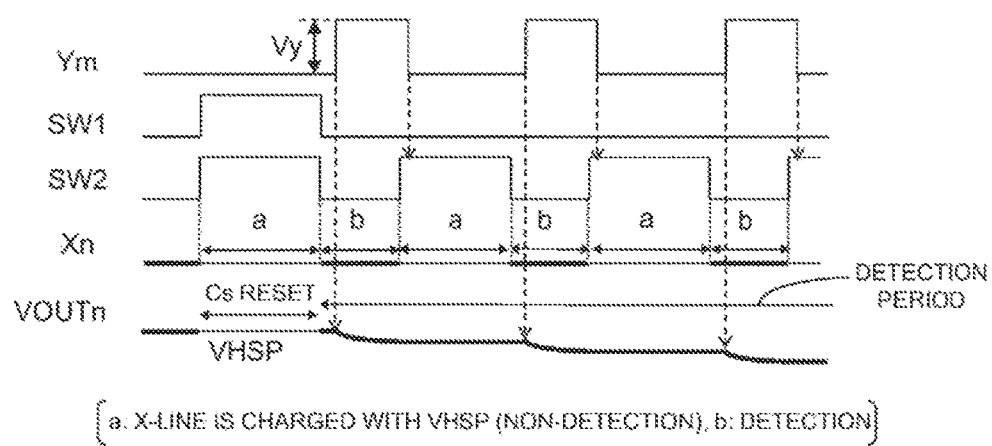
FIG. 5 is a timing chart illustrating an input pulse voltage to the Y electrode and a timing of a detection operation by the integration circuit.

FIG. 5 illustrates an input pulse voltage to the Y electrodes Y1 to YM and a timing of a detection operation by the integration circuit 301. First, the switch SW2 is turned on, the X electrodes Xn (n=1 to N) are allowed to transition to a non-detection state "a" in which the X electrodes Xn are charged with a power source VHSP, and the switch SW1 is turned on, thereby resetting the capacitor Cs. Next, the switch SW1 and the switch SW2 are turned off to transition to a detection stand-by state "b". In the detection stand-by state "b", the X electrodes Xn enter a state of not being connected to the power source VHSP, and thus a voltage level is maintained with the integration circuit 301 having a virtually grounded configuration. In addition, after transition to the detection stand-by state b, a rising pulse having an amplitude Vy is input to the Y electrode Y1 (other Y electrodes Y2 to YM are fixed to a low level). As a result, an electric charge (=Vy×Cxy) is sent to the X electrode Xn through intersection capacitors Cxy on the Y electrode Y1 and is input to the detection circuit 301, and thus an output VOUTn of the operational amplifier AMP varies. When touching with a finger occurs, a capacitance value of an intersection capacitor Cxy corresponding to the touching is reduced by a capacitance value Cf. Accordingly, when assuming that the X electrode X2 is touched, an electric charge that is input to the operational amplifier AMP of the X electrode X2 becomes Vy×(Cxy−Cf), and thus the output VOUT2 of the operational amplifier AMP becomes high. The VOUTn (n=1 to N) is converted to detection data that is a digital value by an A/D converter 302, and is provided for coordinate calculation and the like.

Figure 6:
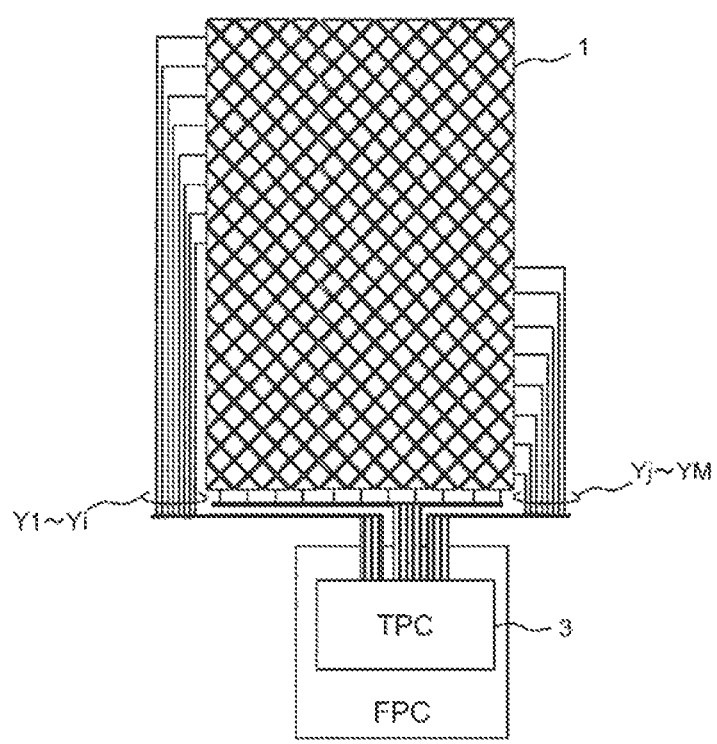
FIG. 6 is a plan view illustrating an example of the touch panel.

FIG. 6 illustrates an example of the touch panel 1. For example, with regard to the Y electrodes Y1 to YM between the touch panel 1 and the touch panel controller 3, interconnection lengths thereof are different between electrodes on a side close to the touch panel controller 3 and electrodes on a side distant from the touch panel controller 3, or the electrodes on the close side are connected to the touch panel controller 3 on a right-hand side and the electrodes on the distant side are connected to the touch panel controller 3 on a left-hand side. With regard to the X electrodes X1 to XN, interconnections may be long at ends of the X electrodes X1 to XN interconnected on the left and on the right side with respect to the center of the touch panel 1 which is closest to the touch panel controller 3, or the ends may be affected by the interconnection environment between interconnections of the Y electrodes Y1 to YM. In addition, in the example illustrated in the drawing, the touch panel controller 3 is mounted on a flexible printed circuit (FPC), but it may be considered that the touch panel controller 3 is mounted on a main substrate through the FPC. When considering the above-described circumstances, detection data S_Data obtained from positions corresponding to one surface of the touch panel 1 is not uniform at any position, and thus it is assumed that a deviation is present.

Figure 7:
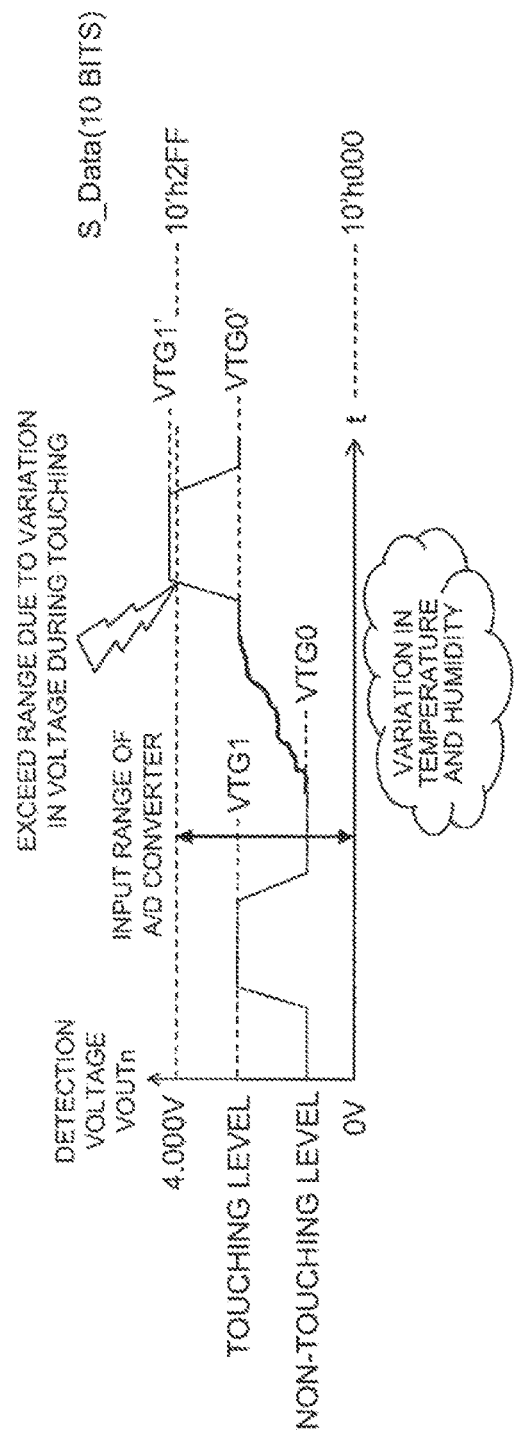
FIG. 7 is a waveform diagram illustrating an output voltage of the integration circuit and a target value of result data of the A/D conversion with respect to the output voltage.

FIG. 7 illustrates an output voltage VOUTn of the integration circuit 301 and a target value of result data (detection data) S_Data of A/D conversion with respect to the output voltage VOUTn. With regard to detection results, it is ideal that a deviation in a value VTG0 of analog detection data S_Data in accordance with a mounting environment as described above is canceled, and thus detection data corresponding to one surface of the touch panel 1 in non-touching is kept at a predetermined permissible value (kept in a range ±ε centering around the value VTG0). In addition, it is ideal that detection data also including detection data in touching is efficiently kept in an input range of an A/D converter provided at a subsequent stage of the detection circuit. Here, a case is exemplified where a conversion output is set to 10 bit accuracy and an A/D converter in which a full-range of an input voltage is set to 4 V is used.

Here, if an ambient environment of a temperature condition or a humidity condition varies (environmental variation), the value VTG0 of the detection data S_Data varies. For example, the value VTG0 of non-touching may increase or decrease. In FIG. 7, a case where the value VTG0 of non-touching increases to VTG0' is exemplified. However, if the touch panel 1 is touched under this condition, there is a concern that a value of touching also becomes VTG1' and may exceed an input range of 0 V to 4 V in the A/D converter. In the following description, a configuration of performing adjustment in order for the detection result not to exceed the input range of 0 V to 4 V in the A/D converter even when the environmental variation occurs will be described in detail. A variation direction of the value VTG0 during environmental variation is different depending on a detection method or a detection circuit. For example, in a case of employing the detection method and the detection circuit configuration which are described with reference to FIGS. 2 to 5, when an ambient temperature is raised and thus a resistance value of Ym and Xn increases, a propagation rate of a signal decreases and thus a voltage variation in the output voltage VOUTn decreases. As a result, a voltage level of the value VTG0 (=VOUTn) is raised. On the other hand, when an ambient temperature is lowered and thus the resistance value of Ym and Xn decreases, the propagation rate of a signal is improved and thus the voltage variation in the output voltage VOUTn increases. As a result, the voltage level of the value VTG0 (=VOUTn) is lowered. Here, a resistive component of the touch panel 1, that is, a resistance value of Ym and Xn is exemplified to describe temperature dependency. However, the variation direction of the value VTG changes depending on an element that may cause a variation in a touch detection system using the touch panel 1.

First Embodiment of Generating Calibration Data Corresponding to Environmental Variation In consideration of the above-described circumstance in which a deviation of the detection data S_Data obtained from positions corresponding one surface of the touch panel 1 occurs depending on a position in accordance with a mounting environment, JP-A-2012-234473 realizes calibration for cancelling the deviation of the detection data so as to realize the above-described ideal condition with respect to the detection data S_Data. In the following description, on the assumption of the calibration, a first embodiment employing a technology of adjusting data for calibration in correspondence with the environmental variation will be described.

Figure 8:
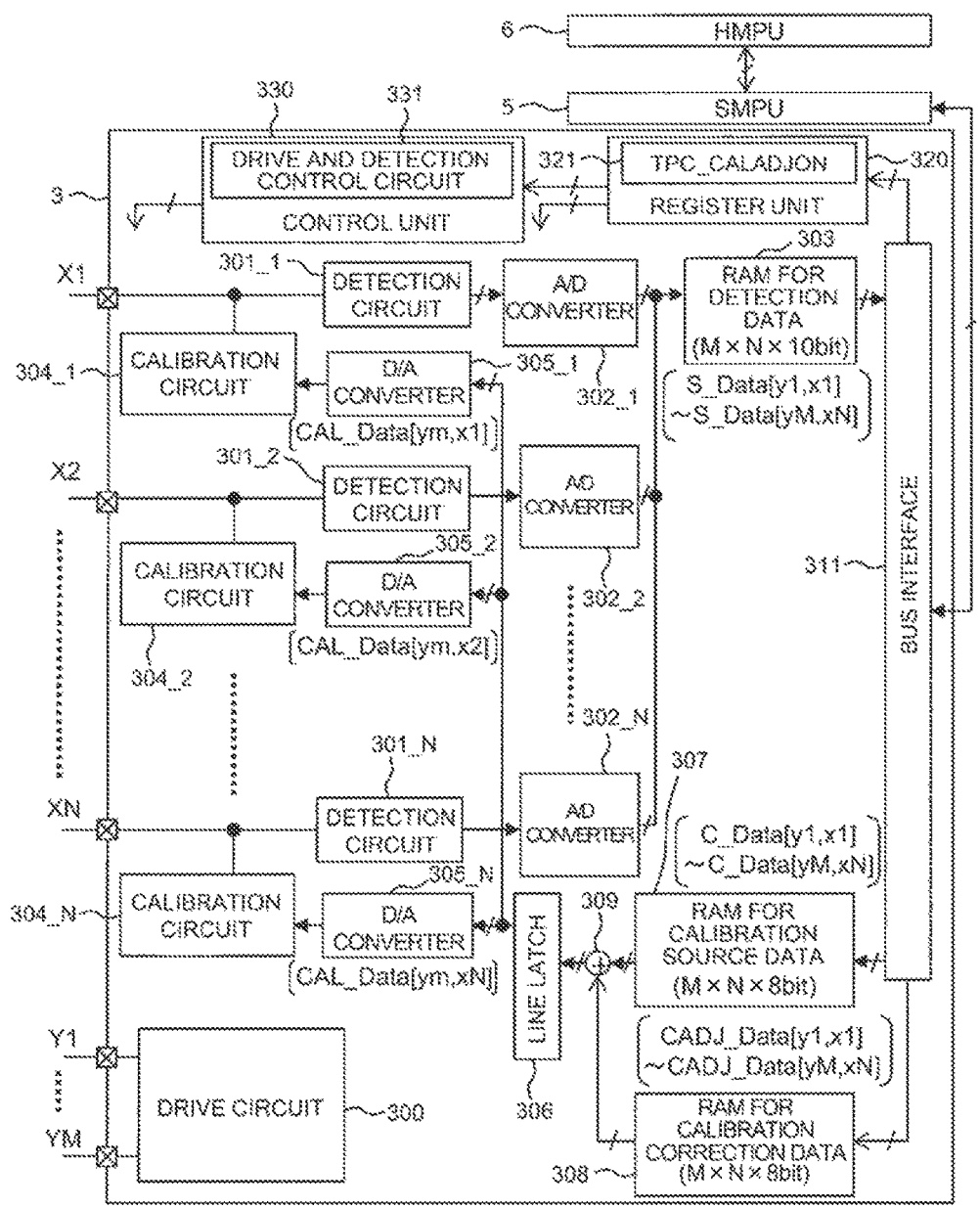
FIG. 8 is a block diagram illustrating a touch panel controller in a first embodiment.

FIG. 8 illustrates a specific example of the touch panel controller 3. In the same drawing, the touch panel controller 3 includes a drive circuit 300 that is representatively shown, detection circuits 301 (301_1 to 301_N), A/D converters 302 (302_1 to 302_N), and a RAM 303 for detection data. In addition, for calibration of touch detection, the touch panel controller 3 includes calibration circuits 304 (304_1 to 304_N), D/A converters 305 (305_1 to 305_N), a line latch 306, a RAM 307 for calibration source data, a RAM 308 for calibration correction data, and an adder 309. The RAM 303 for detection data, the RAM 307 for calibration source data, and the RAM 308 for calibration correction data are interfaced to the sub-processor 5 that is constituted by a microprocessor for a sub-system through a bus interface 311.

Overall control of the touch panel controller 3 is performed by a register unit 320 and a control unit 330. The register unit 320 includes a command register and a data register. In the register unit 320, writing of a command and reading-out and writing of data are performed by the sub-processor 5 through the bus interface 311. A command and a control parameter which are written in the register unit 320 are supplied to the control unit 330, and the control unit 330 performs overall control with respect to components inside the touch panel controller 3 by using the control parameter and the like in accordance with the command. As an overall control logic, a drive and detection control circuit 331 is exemplified in the drawing. Although not particularly limited, partial control data such as initial setting data that is set to the register unit 320 is directly transmitted to internal circuits of the touch panel controller 3 on an inner side thereof.

The drive circuit 300 drives the Y electrodes Y1 to YM with a pulse-shaped AC drive voltage in an electrode arrangement order of the Y electrodes Y1 to YM. Specifically, the drive circuit 300 scanning-drives an intersection capacitor. The detection circuit 301 inputs a detection signal from the intersection capacitor as an intersection capacitor Cxy, which is scanning-driven, through a corresponding X electrode among the X electrodes X1 to XN, periodically takes-in a signal charge, and integrates the signal charge, for example, in a periodic manner as described above. The signal charge that is integrated is converted to detection data by a corresponding A/D converter among the A/D converters 302. Although not particularly limited, here, the X electrodes X1 to XN are provided with the A/D converters 302 (302_1 to 302_N), respectively, and thus converted data in a number according to the number of Y electrodes is generated in a parallel manner for each scanning driving in an electrode unit of the Y electrodes Y1 to YM. The converted detection data pieces S_Data[y1, x1] to S_Data[yM, xN] are accumulated in the RAM 303. When conversion accuracy of the A/D converter is set to 10 bits, detection data pieces S_Data[y1, x1] to S_Data[yM, xN], which correspond to one surface of the touch panel controller 3, become data pieces of 10 bits for each of the intersection capacitors Cxy, and thus the total amount of data pieces is M×N×10 bits. The detection data pieces that are accumulated in the RAM 303 are supplied to the sub-processor 5 through the bus interface 311, and are provided for digital filter operation and coordinate calculation. A calculation result of touch coordinates is used by the host processor (HMPU) 6 that performs overall control of a portable information terminal. In this specification, intersection positions between the drive electrodes Y1 to YM and the detection electrodes X1 to XN are described as [y1, x1] to [yM, xN] for convenience. Accordingly, in data notation such as in the detection data pieces S_Data[y1, x1] to S_Data[yM, xN], [ym, xn], that is, [y1, x1] to [yM, xN] are suffixes indicating intersection positions that correspond to the data pieces.

The calibration circuits 304_1 to 304_N are circuits that apply a signal for offset adjustment with respect to input signals of the detection circuits 301_1 to 301_M. Each of the calibration circuits 304_1 to 304_N operates after receiving an output of each of the D/A converters 305_1 to 305_N. Each of the D/A converters 305_1 to 305_N D/A converts each of calibration data pieces CAL_Data[ym, x1] to CAL_Data[ym, xN] which are supplied from the line latch 306, and outputs the converted data to each of the calibration circuits 304_1 to 304_N. When generating the calibration data pieces CAL_Data[ym, x1] to CAL_Data[ym, xN] which are supplied to the line latch 306, calibration source data pieces C_Data[y1, x1] to C_Data[yM, xN] as first parameter data, and calibration correction data pieces CADJ_Data[y1, x1] to CADJ_Data[yM, xN] as second parameter data configured to perform correction for the calibration source data pieces C_Data[y1, x1] to C_Data[yM, xN] are used. The correction is performed in the adder 309 by adding the calibration correction data pieces CADJ_Data[y1, x1] to CADJ_Data[yM, xN] to the calibration source data pieces C_Data[y1, x1] to C_Data[yM, xN]. The calibration source data pieces C_Data[y1, x1] to C_Data[yM, xN] are written in the RAM 307 through the bus interface 311, and are read out from the RAM 307 in a detection line unit on the basis of control of the control unit 330. The calibration correction data pieces CADJ_Data[y1, x1] to CADJ_Data[yM, xN] are written in the RAM 308 through the bus interface 311, and are read out from the RAM 308 in a detection line unit on the basis of control of the control unit 330.

For example, the calibration source data pieces C_Data[y1, x1] to C_Data[yM, xN] and the calibration correction data pieces CADJ_Data[y1, x1] to CADJ_Data[yM, xN] are data pieces in an 8-bit unit for each of the intersection capacitors Cxy. In a case where correction due to the environmental variation is not necessary, the calibration source data pieces C_Data[y1, x1] to C_Data[yM, xN] are latched by the line latch 306 in a data unit (calibration line unit) in correspondence with intersection capacitors in a unit of the Y electrodes that are sequentially scanning-driven in an electrode order, and become calibration data pieces CAL_Data[ym, x1] to CAL_Data[ym, xN] as third parameter data. In a case where correction due to the environmental variation is desired, the calibration source data pieces C_Data[y1, x1] to C_Data[yM, xN] and the calibration correction data pieces CADJ_Data[y1, x1] to CADJ_Data[yM, xN] are read out from the RAM 307 and the RAM 308 in a data unit (calibration line unit) in correspondence with intersection capacitors in a unit of the Y electrodes that are sequentially scanning-driven in the electrode order, and a plurality of pieces of read-out data corresponding to each other are added by the adder 309, are latched by the line latch 306, and become calibration data pieces CAL_Data[ym, x1] to CAL_Data[ym, xN] as the third parameter data. Each of the calibration data pieces CAL_Data[ym, x1] to CAL_Data[ym, xN], which are latched by the line latch 306, is converted to an analog signal by a corresponding D/A converter among the D/A converters 305_1 to 305_N, and is provided to the calibration circuits 304_1 to 304_N. Each of the calibration circuits 304_1 to 304_N operates to cancel an undesired offset amount from a signal level of a corresponding X electrode among the X electrodes X1 to XN in accordance with the adjustment parameters.

Whether or not to perform the offset adjustment is determined by a set value TPC_CALADJON of a control register 321 as a mode register disposed in the register unit 320, with the control unit 330 referring to the set value.

FIG. 9 illustrates a function of the control register value TPC_CALADJON. When the control register value TPC_CALADJON is 1'b0, the adjustment function of the calibration data is turned off, and the calibration source data pieces C_Data[y1, x1] to C_Data[yM, xN] are used as the calibration data pieces CAL_Data[ym, x1] to CAL_Data[ym, xN]. On the other hand, when the control register value TPC_CALADJON is 1'b1, the adjustment function of the calibration data is turned on, and data pieces obtained by adding the calibration correction data pieces CADJ_Data[y1, x1] to CADJ_Data[yM, xN] to the calibration source data pieces C_Data[y1, x1] to C_Data[yM, xN] are set as the calibration data pieces CAL_Data[ym, x1] to CAL_Data[ym, xN].

For example, it is assumed that digital data pieces corresponding to adjustment values in the case where an ambient temperature T becomes 50° C. or higher are stored in the RAM 307 as the calibration correction data pieces CADJ_Data[y1, x1] to CADJ_Data[yM, xN]. In this case, when the output temperature of a temperature sensor becomes T or higher, the sub-processor 5 detects the output, and sets the control register value TPC_CALADJON to 1. In the case where the output temperature of the temperature sensor is lower than T, the sub-processor 5 sets the control register value TPC_CALADJON to 0. According to this, calibration data pieces CAL_Data[ym, x1] to CAL_Data[ym, xN] that are optimal values depending on ambient temperature are supplied to the calibration circuits 304_1 to 304_N, and thus it is possible to keep detection results in an input range of the A/D converters 302_1 to 302_N.

With regard to a timing of changing the setting of the control register value TPC_CALADJON, or a timing of referencing the control register value TPC_CALADJON by the control circuit 330, the following consideration is provided. Specifically, when the control register value TPC_CALADJON is changed in the middle of one detection frame period in which a cycle of operations of the drive electrodes Y1 to YM is completed and touch detection is performed, detection data to which calibration data after correction is applied and detection data to which calibration data before correction is applied are present together, and thus with respect to presence or absence of touching, erroneous detection is caused. To prevent the erroneous detection in advance, a timing of changing the control register value TPC_CALADJON or a timing of referencing the control register value TPC_CALADJON by the control circuit 330 is set to a breakpoint of the touch detection frame. That is, it is desirable for the changing of the control register value TPC_CALADJON not to be reflected in control of the touch detection in the middle of the touch detection frame.

In the description, the determination reference temperature T is set to one temperature, but a plurality of determination reference temperatures are also possible. In addition, in this case, the control register value TPC_CALADJON is set to 0, and the calibration correction data pieces CADJ_Data[y1, x1] to CADJ_Data[yM, xN] which are stored in the RAM 308 for calibration correction data are rewritten. After the rewriting is completed, the control register value TPC_CALADJON is set to 1. Setting change of the control register value TPC_CALADJON to 1 is reflected on control at the breakpoint of the touch detection frame as described above, and thus a value before correction and a value after correction are not present together in the calibration data for each of the intersection capacitors. Accordingly, erroneous touch detection does not occur.

FIG. 10 illustrates a flow of generation of calibration data capable of coping with the environmental variation, and a touch detection operation using the calibration data. As described above, in the first embodiment, with respect to the calibration source data pieces C_Data[y1, x1] to C_Data[yM, xN] of intersection capacitors, the calibration correction data pieces CADJ_Data[y1, x1] to CADJ_Data[yM, xN] of the intersection capacitors are used. The calibration data in the case of not performing correction satisfies Expression 1, and the calibration data in the case of performing correction satisfies Expression 2.

$$CAL\_Data[ym,xn]=C\_Data[ym,xn] \qquad \text{Expression 1}$$

$$CAL\_Data[ym,xn]=C\_Data[ym,xn]+CADJ\_Data[ym,xn] \qquad \text{Expression 2}$$

The calibration source data C_Data is determined in a state in which the touch panel 1 is assembled to the display panel 2, and the touch panel controller 3 is mounted on a glass substrate of the display panel 2. The calibration source data C_Data is matrix data configured to uniformly adjust the detection value VTG0 in non-touching even when a different interconnection capacitive load or a different interconnection resistive load is present for every electrodes in accordance with a mounting environment. In addition, the calibration correction data CADJ_Data is matrix data configured to uniformly adjust the detection value VTG0 in non-touching in correspondence with an ambient environment such as a temperature and humidity. In a case where the control register value TPC_CALADJON is set to 1, environmental variation corresponding calibration data CAL_Data is generated according to Expression 2. In a case where the control register value TPC_CALADJON is set to 0, the environmental variation corresponding calibration data CAL_Data is generated according to Expression 1.

First, it is assumed that calibration source data C_Data is prepared in RAM 307 in order for creatable detection data S_Data in non-touching to be made uniform for each of the intersections (XY electrode intersections) between the drive electrodes Ym and the detection electrodes Xn at least in a process of shipping portable information terminals. The calibration source data C_Data stated here can be easily created by performing a detection operation in a display module state in which the touch panel 1 is mounted. For example, the detection data S_Data in a case of sequentially changing the calibration source data C_Data is monitored for each intersection. For example, in a 10-bit space, calibration source data C_Data with a decimal notation of, for example, S_Data=256 (dec), may be acquired.

When an operation power source is turned on (S1), as a part of an initialization operation, acquisition of data for calibration is instructed (S2). According to this, the sub-processor 5 transmits the above-described calibration source data C_Data to the RAM 307 embedded in the touch panel controller 3 from, for example, a storage device in the peripheral device 7 (S4). In combination with the transmission, a counter indicating a touch detection line is set to m=1 (S3). Then, in a case where the control register value TPC_CALADJON is 1, the control unit 330 reads out the calibration source data C_Data stored in the RAM 307 and the calibration correction data CADJ_Data stored in the RAM 308 in a unit of a touch detection line indicated by the counter, and transmits the calibration data CAL_Data generated by adding the former and the latter (S14) to the line latch 306 (S5). In a case where the control register value TPC_CALADJON is 0, the control unit 330 reads out the calibration source data C_Data stored in the RAM 307 in a unit of a touch detection line indicated by the counter, and transmits the control data C_Data to the line latch 306 as calibration data CAL_Data (S5). The calibration data CAL_Data, which is transmitted to the line latch 306, is D/A converted with the D/A converters 305_1 to 305_N, and offset adjustment in accordance with the D/A conversion result is performed with respect to, for example, inputs of the detection circuits 301_1 to 301_N. According to this, the detection circuits 301_1 to 301_N perform a detection operation by integrating signals that are shown in the detection electrodes X1 to XN, and acquire an analog detection signal VTG (S6). The detection signal VTG is converted to digital detection data S_Data by the A/D converters 302_1 to 302_N and is stored in the RAM 303. Whenever a cycle of step S5 to step S7 is completed, the counter value m increments (S9), and the processes of step S5 to step S7, and step S9 are repeated until m becomes M (S8).

In step S8, when m is determined as M, the sub-processor 5 determines whether or not touching occurs by using detection data pieces S_Data[y1, x1] to S_Data[yM, xN] which correspond to one frame of the touch detection frame and are stored in the RAM 303. That is, the determination of whether or not touching occurs is performed with reference to the detection data S_Data [ym, xn] for each of the XY electrode intersections. The determination of whether or not touching occurs may be performed by various determination methods. As an example thereof, a determination method using a temporal variation amount of S_Data can be used. When a variation value of the S_Data in a touch frame unit exceeds 300 (dec), it can be determined that touching occurs.

In a case where touching occurs, the sub-processor 5 performs a coordinate calculation of a touch position by using the detection data S_Data [ym, xn] for each of the XY electrode intersections (S15). In a case where touching occurs, the process returns to step S3 in combination with the calculation, and a process with respect to a subsequent touch detection frame is initiated.

On the other hand, in step S10, when it is determined that touching does not occur, determination of a non-touching level, and generation or updating of calibration correction data is performed (S1 to S13).

When a target of the detection data S_Data in non-touching, by offset adjustment with the calibration source data C_Data, is set to S_Data=256 (dec), ideally, the detection data continuously satisfy a relationship of S_Data=256. Here, when touching does not occur, in a case where a rapid variation does not occur in the detection data S_Data and a value of the detection data S_Data varies to increase or decrease from 256, it is determined that the non-touching level varies due to a variation in an ambient environment, for example, a variation in temperature (S11). As a determination reference, a parameter $\delta$ is set. In a case where a relationship of S_Data≤256±$\delta$ is satisfied, it is determined that the environmental variation is small, and the detection operation from step S3 is restarted without changing the calibration correction data CADJ_Data. In a case where a relationship of S_Data≤256±$\delta$ is satisfied, it is determined that the environmental variation is large, a correction value of the calibration correction data CADJ_Data configured to correct a value of the calibration source data C_Data corresponding to the detection data is calculated (S12), and data of a corresponding address in the RAM 308 is rewritten (S13). Here, it is assumed that the parameter $\delta$ is determined in accordance with characteristics or setting of the detection circuit 301. For example, a variation $\Delta$S_Data in the detection data S_Data in a case where calibration data CAL_Data varies by 1 pitch can be predicted with circuit setting of the detection circuit 301, and thus $\delta$ may be set, for example, to $\Delta$S_Data. In an example of the prediction, as a physical variation, for example, a current variation or an electric charge variation in a case where the calibration data CAL_Data varies by "1", a value, which varies in an amount $\Delta$S_Data multiplied by a gain of the detection circuit 301, is used. The gain is determined by circuit setting, and it can be said that the prediction is possible.

An initial value of all calibration correction data pieces CADJ_Data[ym, xn] at intersection positions, which are initially stored in the RAM 308, is set to, for example, zero. In a case where a relationship of S_Data256+$\delta$ is satisfied, calibration correction data CADJ_Data, in which calibration data CAL_Data of the detection data corresponding to an XY electrode intersection position becomes +1, is calculated (S12), and may be stored in a corresponding position in the RAM 308 for calibration correction data (S13). In a case where a relationship of S_Data256−$\delta$ is satisfied, calibration correction data CADJ_Data, in which calibration data CAL_Data of the detection data corresponding to an XY electrode intersection position becomes −1, is calculated (S12), and may be stored in a corresponding position of the RAM 308 for calibration correction data (S13). The corresponding position represents a storage position of the calibration correction data CADJ_Data which corresponds to the same intersection position as the detection data S_Data that is a determination target.

In a case where an updating interval of the calibration correction data is large, when all calibration correction data pieces in the RAM 308 are optimized, this becomes a cause of erroneous touch determination. Accordingly, in this case, it is preferable that the control register value TPC_CALADJON be kept at zero before calibration correction data pieces at all XY electrode intersection positions are acquired and are written in the RAM 308. On the other hand, as described above, since the updating interval of the calibration correction data is as small as ±1, it is considered that there is no concern of the erroneous touch determination even when calibration correction data in the RAM 308 is sequentially updated. Accordingly, in this case, after the calibration correction data pieces at all XY electrode intersection positions are acquired, and are written in the RAM 308 once, it is possible to cope with the environmental variation in a dynamic manner by updating the calibration correction data while keeping the control register value TPC_CALADJON to 1.

Although not particularly limited, in a case of coping with the environmental variation in a dynamic manner, the processes of step S12 and step S13 of acquiring the calibration correction data CADJ_Data are completed before touch detection of a subsequent touch detection frame is initiated. In other words, the processes of steps S11 to S13 are performed in a possible range before a touch detection timing of a subsequent touch detection frame is initiated. In a case where it is difficult to complete the processes with respect to detection data pieces of the entire touch detection frames, the processes may be stopped. Next, with respect to detection data of a subsequent touch detection frame, the process of step S11 may be performed from detection data at an intersection position at which the immediately previous process is stopped.

For example, a truth-value table of the calibration correction data CADJ_Data that is stored in the RAM 308 for calibration correction data is exemplified in FIG. 11. This example represents a case in which a correction range with the correction data CADJ_Data is set to ±32 (dec) by six bits, and there is no particular limitation thereon. According to this, even in a relationship of S_Data256±δ is satisfied due to the environmental variation of a temperature, humidity, and the like, a relationship of S_Data≅256 can be maintained by correcting the calibration source data C_Data by using corresponding calibration correction data CADJ_Data. Unlike in a process of rewriting all data pieces in the RAM 307 in correspondence with the environmental variation, it is possible to easily realize calibration data adjustment so as to cope with the environmental variation.

Figure 12:
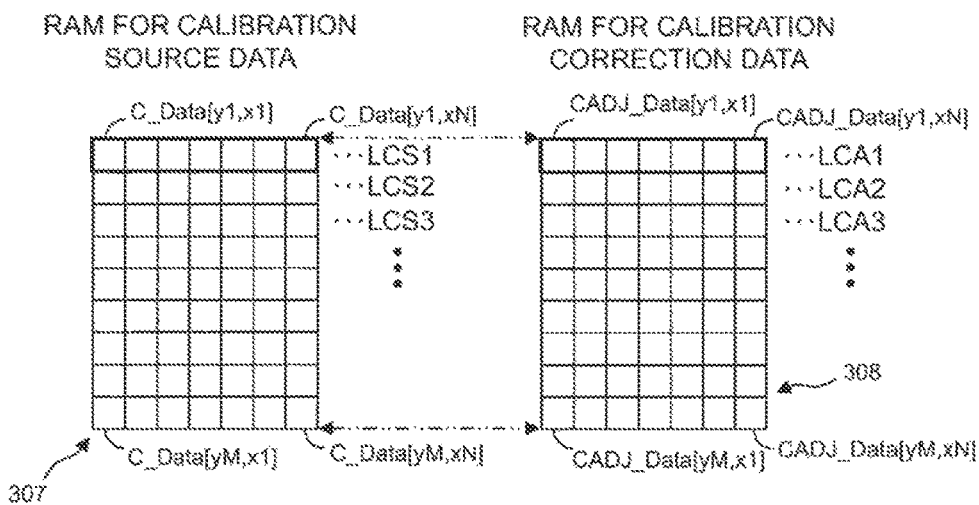
FIG. 12 is an explanatory view illustrating correspondence between an arrangement of XY electrode intersections of the touch panel and data mapping of a RAM for calibration in the first embodiment.

FIG. 12 illustrates correspondence between an arrangement of the XY electrode intersections of the touch panel 1 and data mapping of the RAM 307 and the RAM 308 for calibration in the first embodiment. For example, FIG. 12 illustrates an aspect in which the calibration source data C_Data and calibration correction data CADJ_Data which correspond to upper and left side (y1, x1) of the touch panel 1 are stored in upper and left addresses of the corresponding RAM 307 and RAM 308. In FIG. 12, LCSm represents a row of calibration source data pieces (calibration source data line) corresponding to a detection line Ym of the touch panel 1. In FIG. 12, LCAm represents a row of calibration correction data pieces (calibration correction data line) corresponding to the detection line Ym of the touch panel 1.

Figure 13:
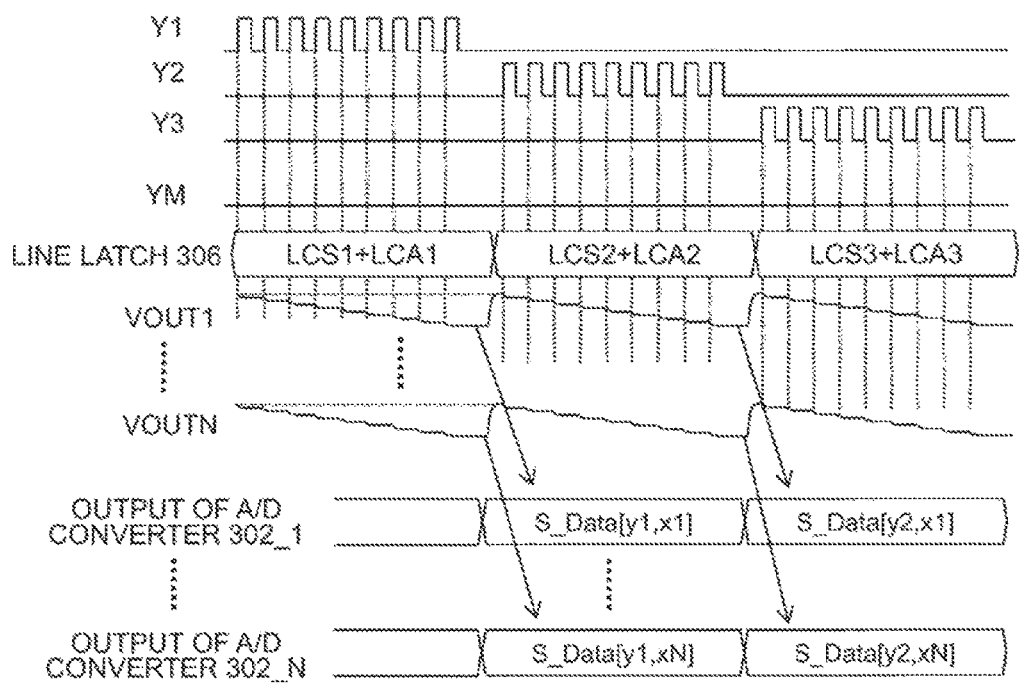
FIG. 13 is an operation timing chart illustrating a relationship between calibration data and detection data in a case of performing a detection operation by giving attention to drive electrodes Y1 to Y3 of the touch panel.

FIG. 13 illustrates an operation timing illustrating a relationship between the calibration data and the detection data in a case of performing a detection operation by giving attention to the drive electrodes Y1 to Y3 of the touch panel 1 as an example. First, immediately before a pulse is input to the electrode Y1, data pieces C_Data[y1, x1] to C_Data[y1, xN] in a corresponding calibration source data line LCS1 are read out from the RAM 307, data pieces CADJ_Data[y1, x1] to CADJ_Data[y1, xN] of a corresponding calibration correction data line LCA1 are read out from the RAM 308, the latter (LCA1) is added to the former (LCS1) in the adder 309, and the resultant added data pieces are latched as calibration data pieces CAL_Data[y1, x1] to CAL_Data[y1, xN] in the line latch 306.

The calibration data pieces CAL_Data[y1, x1] to CAL_Data[y1, xN] which are latched in the line latch 306 are converted to analog control signals in the D/A converter 305, and the resultant analog control signals are supplied to the calibration circuit 304. The calibration circuit 304 performs an operation of canceling offset of the detection electrodes X1 to XN on the basis of the analog control signals to obtain detection voltages VOUT1 to VOUTN. The detection voltages VOUT1 to VOUTN are converted to detection data pieces S_Data[y1, x1] to S_Data[y1, xN] in the A/D converter 302, and are stored in the RAM 303. The drive electrode Y2 is driven at a subsequent drive cycle of the pulse drive period of the drive electrode Y1, and at this time, immediately before the driving, data pieces C_Data[y2, x1] to C_Data[y2, xN] of a corresponding calibration source data line LCS2 are read out from the RAM 307, data pieces CADJ_Data[y2, x1] to CADJ_Data[y2, xN] of a corresponding calibration correction data line LCA2 are read out from the RAM 308, the latter (LCA2) is added to the former (LCS2) in the adder 309, and the resultant added data pieces are latched as calibration data pieces CAL_Data[y2, x1] to CAL_Data[y2, xN] in the line latch 306. As described below, when switching the drive electrode Ym that is pulse-driven, the detection operation is performed while transmitting the calibration data CAL_Data, which is obtained by adding corresponding calibration source data C_Data and corresponding calibration correction data CADJ_Data, to the line latch 306.

Figure 14:
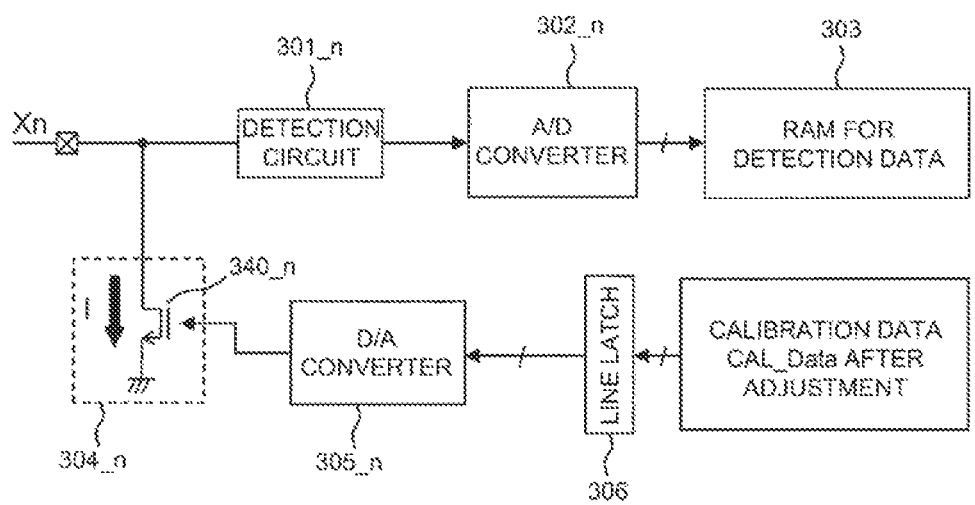
FIG. 14 is an explanatory view illustrating a calibration circuit that adjusts an input signal from a detection electrode Xn of the touch panel with an amount of current of a current source in accordance with calibration data.
Figure 15:
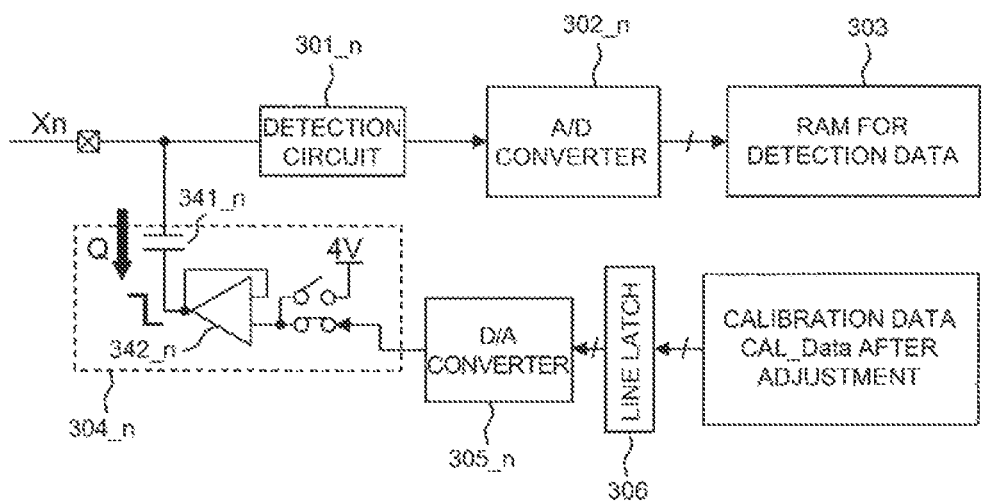
FIG. 15 is an explanatory view illustrating the calibration circuit that adjusts the input signal from the detection electrode Xn of the touch panel with a capacitive charge in accordance with the calibration data.
Figure 16:
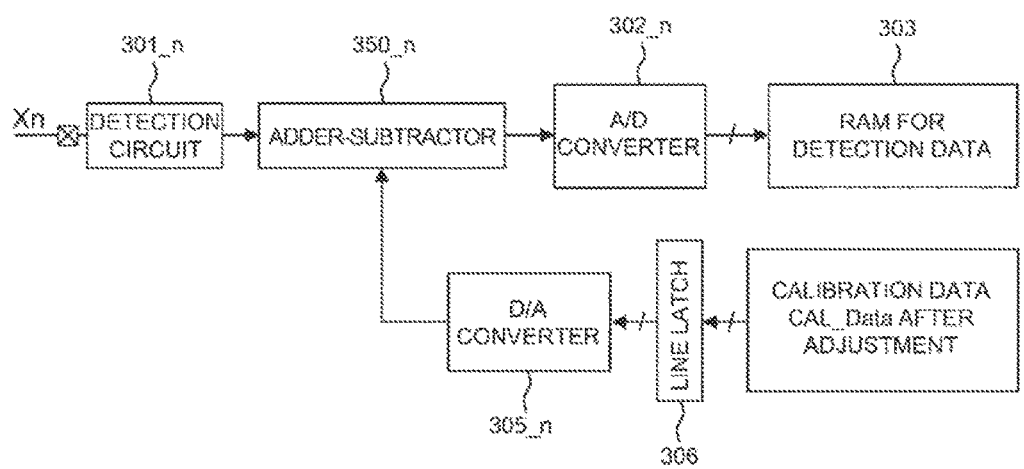
FIG. 16 is an explanatory view illustrating the calibration circuit that performs offset adjustment with respect to an output of the detection circuit.

FIGS. 14 to 16 illustrate examples of the calibration circuit.

FIG. 14 illustrates a case in which an input signal from the detection electrode Xn of the touch panel 1 is adjusted with an amount of current of a current source in accordance with the calibration data. This case is configured in such a manner that an amount of current of a constant current source 340_n that is schematically illustrated is controlled with an output voltage of a D/A converter 305_n.

FIG. 15 illustrates a case in which the input signal from the detection electrode Xn of the touch panel 1 is adjusted with a capacitance charge in accordance with the calibration data. This case is configured in such a manner that a capacitive electrode on one side of the schematically illustrated capacitive element 341_n is driven with a buffer amplifier 342_n, and a capacitive coupling voltage applied to a capacitive electrode on the other side coupled to the detection electrode Xn is controlled in correspondence with a driven amount. An output voltage of the buffer amplifier 342_n is controlled by an output of the D/A converter 305_n.

Unlike in the above-described configuration, FIG. 16 illustrates a case in which the offset adjustment is performed with respect to an output of the detection circuit, and the output is adjusted with a voltage. Here, an adder-subtractor 350_n as a calibration circuit is provided between the detection circuit 301_n and the A/D converter 302_n. The adder-subtractor 350_n adjusts offset by adding or subtracting a voltage converted in the D/A converter 305_n to or from the output voltage VOUTn of the detection circuit 3.

According to the above-described first embodiment, the RAM 307 for calibration source data and the RAM 308 for calibration correction data are embedded in the touch panel controller 3, and thus it is not necessary to transmit corresponding calibration source data and corresponding calibration correction data whenever a drive line is switched by activating bus access by external sub-processor 5. The control unit 300 may autonomously perform internal transmission control at the inside of the touch panel controller 3. Unlike in a case in which the RAM 307 for calibration source data and the RAM 308 for calibration correction data are provided outside the touch panel controller 3, it is possible to suppress the bus interface from being occupied for a long time in a data transmission process, and it is possible to contribute to reduction of power consumed by data transmission.

In addition, in the touch detection period in which a circuit operates, whenever the drive electrode Ym is switched, it is desirable to perform an operation of reading out corresponding line data corresponding to the RAM for calibration with high frequency, and to sequentially transmit the line data to the line latch. In the case of not using the calibration correction data, for example, when an ambient temperature varies and thus an optimal calibration value varies, it is desirable to stop the detection operation at once, to directly rewrite the calibration data in the RAM, and to restart the detection operation. The reason for this is as follows. In a case where the rewriting is performed without stoppage, reference determination of whether or not touching occurs is greatly changed with respect to the detection signal, and this change causes erroneous detection. In addition, when the calibration data during the rewriting is used, erroneous detection frequently occurs, and thus touch detection reliability decreases. During the detection operation stopping period, it is desirable to set a time period of not accepting manipulation of a terminal on which the touch panel is mounted, and thus operability deteriorates. Therefore, this case is not preferable.

As described above, the calibration source data is corrected with calibration correction data as desired with respect to the environmental variation of a temperature and the like, and the calibration correction data is sequentially updated in small intervals. Accordingly, even when the detection operation is not paused or not stopped, the determination reference of whether or not touching occurs does not vary with respect to the detection signal. Accordingly, the touch detection reliability does not decrease, and deterioration in operability, which occurs when manipulation of a portable information terminal TML is not temporarily accepted due to pause or stoppage of the touch detection operation, also does not occur. In addition, dynamic calibration of optimizing the calibration value without stopping the detection operation is also possible.

Figure 17:
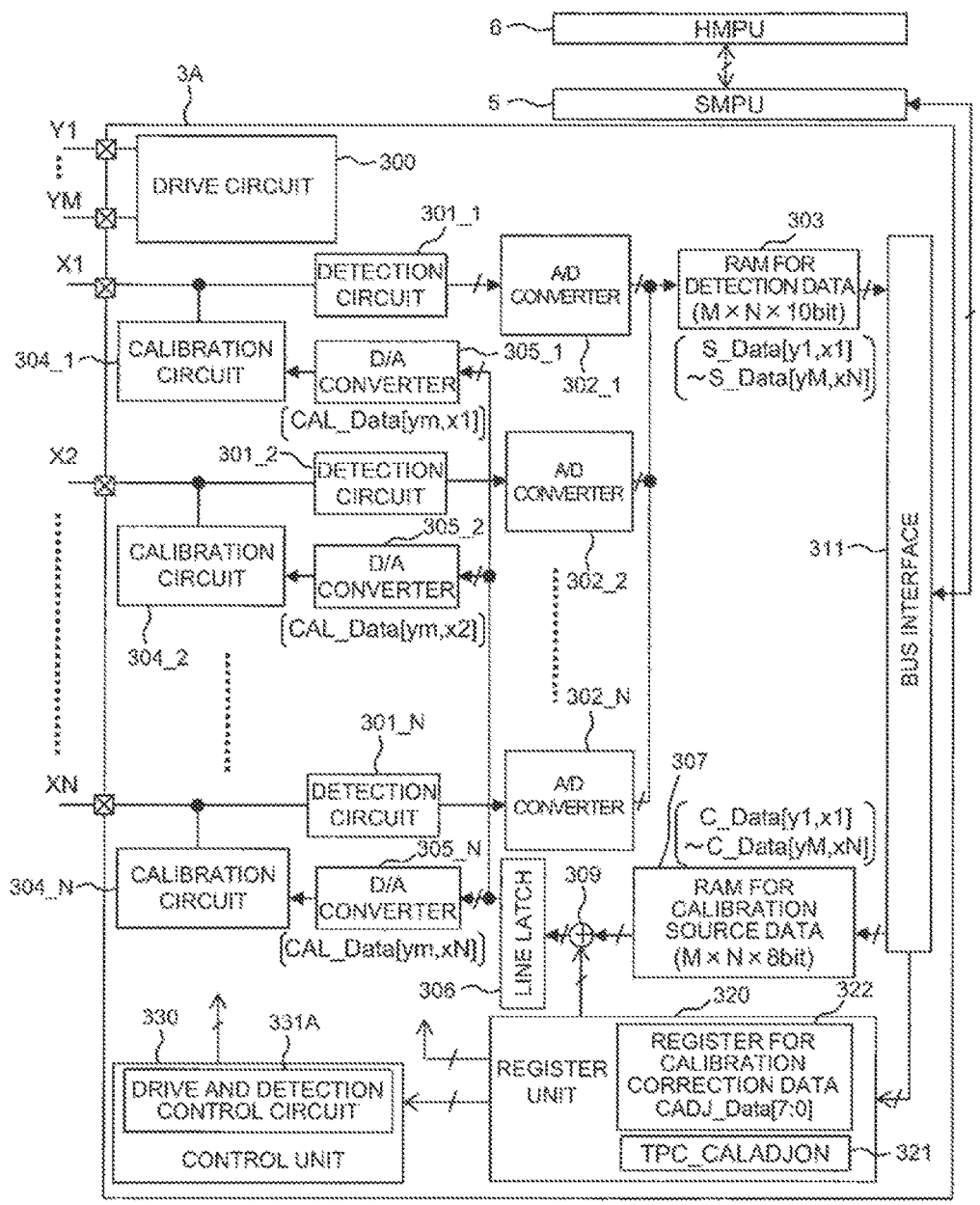
FIG. 17 is a block diagram illustrating a touch panel controller which generates calibration data corresponding to the environmental variation according to a second embodiment.

Second Embodiment of Generating Calibration Data Corresponding to Environmental Variation FIG. 17 illustrates a touch panel controller 3A according to a second embodiment in which calibration data corresponding to the environmental variation is generated. The touch panel controller 3A can be substituted for the touch panel controller 3 according to the first embodiment.

The second embodiment is different from the first embodiment in that for example, a register (parameter register) 322 storing 8-bit calibration correction data CADJ_Data[7:0] is employed instead of the RAM 308 for calibration correction data. In addition, the calibration correction data CADJ_Data[7:0] used here is a representative value of the entirety of touch detection frames not a value for each of the intersections between the drive electrode Ym and the detection electrode Xn. The first embodiment and the second embodiment are also different from each other in this regard. In the first embodiment, even when a variation in an ambient environment, for example, a temperature variation occurs, the calibration data C_Data is corrected by using each of the calibration correction data pieces CADJ_Data[y1, x1] to CADJ_Data[yM, xN] for respective intersections between the drive electrodes Ym and the detection electrodes Xn in order for the detection data in non-touching to satisfy a relationship of S_Data=256. Writing of calibration correction data CADJ_Data[7:0] in the register 322 is performed by the sub-processor 5. The control unit 330 allows the adder 309 to add calibration correction data CADJ_Data[7:0], which is output from the register 322, to calibration source data C_Data read out from the RAM 307 in a unit of a touch detection line every time. The other configurations are the same as FIG. 8, and thus detailed description thereof will not be repeated.

FIG. 18 is a flowchart illustrating generation of calibration data capable of coping with the environmental variation and touch detection operation using the calibration data in the second embodiment.

As described above, in the second embodiment, the calibration correction data CADJ_Data[7:0] as a representative value is used with respect to calibration source data pieces C_Data[y1, x1] to C_Data[yM, xN] of intersection capacitors. Calibration data in a case of not performing correction satisfies Expression 3, and calibration data in a case of performing correction satisfies Expression 4.

$$CAL\_Data[ym,xn]=C\_Data[ym,xn] \qquad \text{Expression 3}$$

$$CAL\_Data[ym,xn]=C\_Data[ym,xn]+CADJ\_Data[7:0] \qquad \text{Expression 4}$$

The calibration source data C_Data is determined in a state in which the touch panel 1 is assembled for the display panel 2, and the touch panel controller 3 is mounted on a glass substrate of the display panel 2. The calibration source data C_Data is matrix data configured to uniformly adjust the detection data S_Data in non-touching even when a different interconnection capacitive load or a different interconnection resistive load is present for every electrodes in accordance with a mounting environment. In addition, the calibration correction data CADJ_Data[7:0] is register data configured to adjust the detection data S_Data in non-touching in correspondence with the ambient environment. In a case where the control register value TPC_CALADJON is set to 1, environmental variation corresponding calibration data CAL_Data is generated according to Expression 4. That is, the calibration correction data CADJ_Data[7:0], which is representative value, is added or subtracted to or from the calibration source data C_Data for each of the intersections (also, referred to as XY electrode intersections) of the drive electrodes Ym and the detection electrodes Xn to generate calibration data CAL_Data.

First, it is assumed that calibration source data C_Data is prepared in RAM 307 in order for creatable detection data S_Data in non-touching to be made uniform for each of the XY electrode intersections at least in a process of shipping portable information terminals. The calibration source data C_Data mentioned here can be easily created by performing a detection operation in a display module state in which the touch panel 1 is mounted. For example, the detection data S_Data in a case of sequentially changing the calibration source data C_Data is monitored for each intersection. For example, in a 10-bit space, calibration source data C_Data with a decimal notation of, for example, S_Data=256(dec), may be acquired.

When an operation power source is turned on (S1), as a part of an initialization operation, acquisition of data for calibration is instructed (S2). According to this, the sub-processor 5 transmits the above-described calibration source data C_Data to the RAM 307 embedded in the touch panel controller 3 from, for example, a storage device in the peripheral device 7 (S4). In combination with the transmission, a counter indicating a touch detection line is set to m=1 (S3). Then, in a case where the control register value TPC_CALADJON is 1, the control unit 330 reads out the calibration source data C_Data stored in the RAM 307 and the calibration correction data CADJ_Data[7:0] stored in the register 322 in a unit of a touch detection line indicated by the counter, and transmits the calibration data CAL_Data generated by adding the former and the latter (S14) to the line latch 306 (S5). In a case where the control register value TPC_CALADJON is 0, the control unit 330 reads out the calibration source data C_Data stored in the RAM 307 in a unit of a touch detection line indicated by the counter, and transmits the calibration source data C_Data to the line latch 306 as calibration data CAL_Data (S5). The calibration data CAL_Data, which is transmitted to the line latch 306, is D/A converted with the D/A converters 305_1 to 305_N, and offset adjustment in accordance with the D/A conversion result is performed with respect to, for example, inputs of the detection circuits 301_1 to 301_N. According to this, the detection circuits 301_1 to 301_N perform a detection operation by integrating signals that are shown in the detection electrodes X1 to XN, and acquire an analog detection signal VTG (S6). The detection signal VTG is converted to digital detection data S_Data by the A/D converters 302_1 to 302_N and is stored in the RAM 303. Whenever a cycle of step S5 to step S7 is completed, the counter value m increments (S9), and the processes of step S5 to step S7, and step S9 are repeated until m becomes M (S8).

In step S8, when m is determined as M, the sub-processor 5 determines whether or not touching occurs by using detection data pieces S_Data[y1, x1] to S_Data[yM, xN] which correspond to one frame of the touch detection frame and are stored in the RAM 303. That is, the determination of whether or not touching occurs is performed with reference to the detection data S_Data [ym, xn] for each of the XY electrode intersections. The determination of whether or not touching occurs may be performed by various determination methods. As an example thereof, a determination method using a temporal variation amount of S_Data can be used. When a variation value of the S_Data in a touch frame unit exceeds 300 (dec), it can be determined that touching occurs.

In a case where touching occurs, the sub-processor 5 performs a coordinate calculation of a touch position by using the detection data S_Data [ym, xn] for each of the XY electrode intersections (S15). In a case where touching occurs, the process returns to step S3 in combination with the calculation, and a process with respect to a subsequent touch detection frame is initiated.

On the other hand, in step S10, when it is determined that touching does not occur, determination of a non-touching level and correction of a calibration value are performed (S21 to S23).

When a target of the detection data S_Data in non-touching by offset adjustment with the calibration source data C_Data is set to S_Data=256 (dec), ideally, the detection data continuously satisfies a relationship of S_Data≅256. Here, when touching does not occur, in a case where a rapid variation does not occur in detection data S_Data at a specific position, or an average value of detection data pieces S_Data in a detection frame, and the corresponding data varies to increase or decrease from 256, it is determined that the non-touching level varies due to a variation in an ambient environment, for example, a variation in a temperature (S21). As a determination reference, a parameter δ is set. In the case where a relationship of S_Data≤256±δ is satisfied with respect to the detection data S_Data at a specific position or the average value (hereinafter, simply referred to as a determination value) of the detection data pieces S_Data in the detection frame, it is determined that the environmental variation is small, and the detection operation from step S3 is restarted without changing the calibration correction data CADJ_Data[7:0]. In a case where a relationship of S_Data256±δ is satisfied with respect to the determination value, it is determined that the environmental variation is large, a correction value of the calibration correction data CADJ_Data[7:0] configured to correct a value of the calibration source data C_Data is calculated (S22), and data of a corresponding address in the register 322 is rewritten (S23). Here, it is assumed that the parameter δ is determined in accordance with characteristics or setting of the detection circuit 301. A variation ΔS_Data in the detection data CADJ_Data[7:0] in a case where calibration data CAL_Data varies by 1 can be predicted with circuit setting of the detection circuit 301, and thus δ may be set, for example, to ΔS_Data. In an example of the prediction, as a physical variation, for example, a current variation or an electric charge variation in a case where the calibration data CAL_Data varies by "1", a value, which varies in an amount ΔS_Data multiplied by a gain of the detection circuit 301, is used. The gain is determined by circuit setting, and it can be said that the prediction is possible.

An initial value of all calibration correction data CADJ_Data[7:0] initially stored in the register 322 is set to zero. In a case where a relationship of S_Data256+δ is satisfied with respect to the determination value, calibration correction data CADJ_Data[7:0], in which calibration data CAL_Data corresponding to the determination value becomes +1, is calculated (S22), and the resister 322 is overwritten with the resultant calculated data (S23). In a case where a relationship of S_Data256−δ is satisfied with respect to the determination value, calibration correction data CADJ_Data[7:0], in which the calibration data CAL_Data corresponding to the determination value becomes −1, is calculated (S22), and the register 322 is overwritten with the resultant calculated data (S23).

As is the case with the first embodiment, the truth-value shown in FIG. 11 may be employed as the value of the calibration correction data CADJ_Data[7:0] stored in the register 322. As described above, the number of effective bits of the calibration correction data, and the relationship between the register value and the value of the calibration correction data are illustrative only, and may be appropriately changed.

Figure 19:
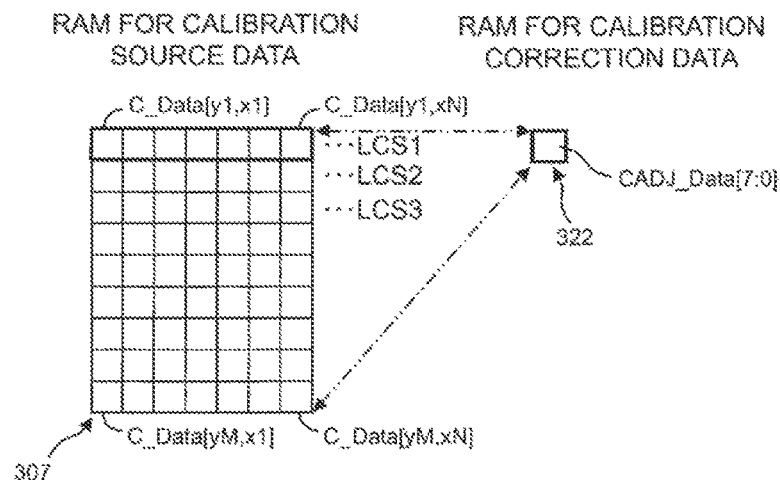
FIG. 19 is an explanatory diagram illustrating correspondence between an arrangement of XY electrode intersections of a touch panel, and data mapping of a RAM for calibration and a register in the second embodiment.

FIG. 19 illustrates correspondence between an arrangement of the XY electrode intersections of the touch panel 1, and data mapping of the RAM 307 for calibration and the register 322 in the second embodiment. For example, FIG. 19 illustrates an aspect in which the calibration source data C_Data which corresponds to upper and left side (y1, x1) of the touch panel 1 is stored in an upper and left side address of the corresponding RAM 307. In FIG. 19, LCSm represents a row of calibration source data pieces (calibration source data line) corresponding to a detection line Ym of the touch panel 1. The register 322 retains calibration correction data CADJ_Data[7:0] that is common to the XY intersection electrodes of the touch panel 1.

Figure 20:
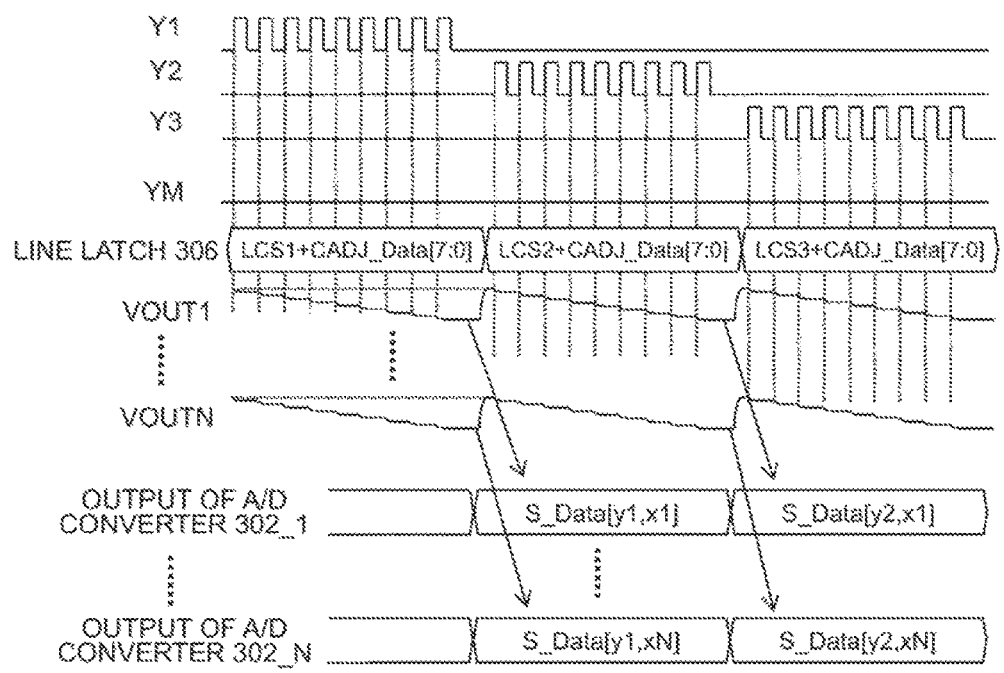
FIG. 20 is an operation timing chart illustrating a relationship between calibration data and detection data in the case of performing a detection operation by giving attention to drive electrodes Y1 to Y3 of the touch panel.

FIG. 20 illustrates an operation timing illustrating a relationship between the calibration data and the detection data in a case of performing a detection operation by giving attention to the drive electrodes Y1 to Y3 of the touch panel 1 as an example. First, immediately before a pulse is input to the electrode Y1, data pieces C_Data[y1, x1] to C_Data [y1, xN] in a corresponding calibration source data line LCS1 are read out from the RAM 307, the calibration correction data CADJ_Data[7:0] is read out from the register 322, addition of the correction data CADJ_Data[7:0] is performed in an 8-bit data unit of the data pieces C_Data[y1, x1] to C_Data [y1, xN] in the adder 309, and the resultant added data is latched as calibration data pieces CAL_Data [y1, x1] to CAL_Data[y1, xN] in the line latch 306.

The calibration data pieces CAL_Data[y1, x1] to CAL_Data[y1, xN] which are latched in the line latch 306 are converted to analog control signals in the D/A converter 305, and the resultant analog control signals are supplied to the calibration circuit 304. The calibration circuit 304 performs an operation of canceling offset of the detection electrodes X1 to XN on the basis of the analog control signals to obtain detection voltages VOUT1 to VOUTN. The detection voltages VOUT1 to VOUTN are converted to detection data pieces S_Data[y1, x1] to S_Data[y1, xN] in the A/D converter 302, and are stored in the RAM 303. The drive electrode Y2 is driven at a subsequent drive cycle of the pulse drive period of the drive electrode Y1, and at this time, immediately before the driving, data pieces C_Data [y2, x1] to C_Data[y2, xN] of a corresponding calibration source data line LCS2 are read out from the RAM 307, the calibration correction data CADJ_Data[7:0] is read out from the register 322, addition is performed in an 8-bit unit as described above, and the resultant added data pieces are latched as calibration data pieces CAL_Data[y2, x1] to CAL_Data[y2, xN] in the line latch 306. As described below, when switching the drive electrode Ym that is pulse-driven, the detection operation is performed by performing addition of corresponding calibration source data C_Data and the calibration correction data CADJ_Data[7:0].

According to the second embodiment, it is possible to realize shortening a calculation time taken to acquire the calibration correction data and reduction in a data amount of the calibration correction data in comparison to the first embodiment. The calibration correction data is a representative value with respect to the touch detection frame, and thus when a great difference in an effect of a temperature exists between portions of the touch detection frame, offset adjustment accuracy of the detection signal decreases. The other operational effects are the same as the first embodiment.

Third Embodiment of Generating Calibration Data Corresponding to Environmental Variation FIG. 21 illustrates a touch panel controller 3B according to a third embodiment in which calibration data corresponding to the environmental variation is generated. The touch panel controller 3B according to the third embodiment can be substituted for the touch panel controller 3 according to the first embodiment.

The third embodiment is different from the first and second embodiments in that the touch panel controller 3B does not use the RAM 308 for calibration correction data or the register 322, and rewriting of the calibration source data C_Data in the RAM 307 is possible by address control for realization of dynamic calibration. Particularly, FIG. 21 illustrates an address control circuit with respect to the RAM 307. Although not shown, an address control circuit for RAM 307 and the like is also provided in the first and second embodiments. Particularly, in the third embodiment, control is ensured so that reading-out of the calibration source data C_Data from the RAM 307 by a drive and detection control circuit 331B through the address control circuit 332, and writing of the calibration source data C_Data in the RAM 307 through an address control circuit 332 in response to a writing command from the sub-processor 5 do not compete with each other. Specifically, a signal TENB is a signal with which the drive and detection control circuit 331 instructs the address control circuit 322 to transmit the calibration source data C_Data from the RAM 307 to the line latch 306. A signal WEND is a signal for notifying the drive and detection circuit of a writing completion state of the calibration source data C_Data with respect to the RAM 307. The drive and detection control circuit 331 confirms that the signal WEND is in an enable state (writing completion state), and sets the signal TENB to enable (transmission instruction).

The reason that the timing control is desirable for ensuring of the dynamic calibration will be described. The calibration circuit 304 operates in accordance with the calibration data CAL_Data transmitted to the line latch 306. A value of the calibration data CAL_Data of the line latch 306 is transmitted from the RAM 307 when the Y electrode Ym to be detected is switched, but a transmission time is sufficiently shorter than a detection time. In order words, a stand-by time from a reading-out operation of the RAM 307 up to a timing of switching into a subsequent Y electrode Ym is long. In addition, the calibration source data C_Data for the same Y electrode Ym is read out again from the RAM 307 after passage of one frame of the touch detection. In consideration of the above-described circumstances, in a case where an ambient environment varies, and the optimal calibration value also varies, with respect to an address at which data transmission to the line latch 306 is completed, an rewriting operation in the RAM 307 may be performed at a stand-by time before a subsequent reading is performed. For this control, it is desirable for a detection operation to start during a rewriting operation of the RAM 307 for calibration source data C_Data in order to prevent the data transmission to the line latch 306 from being performed in parallel. To realize this, the drive and detection control circuit gives an instruction regarding a data transmission timing from a defined RAM 307 to the line latch 306 to the address control circuit 332 with the signal TENB, and the address control circuit 332 gives an instruction regarding a rewriting completion timing of the RAM 307, which outputs the data, to the drive and detection control circuit 331 with the signal WEND. In this embodiment, the register 321 is not necessary.

Figure 22:
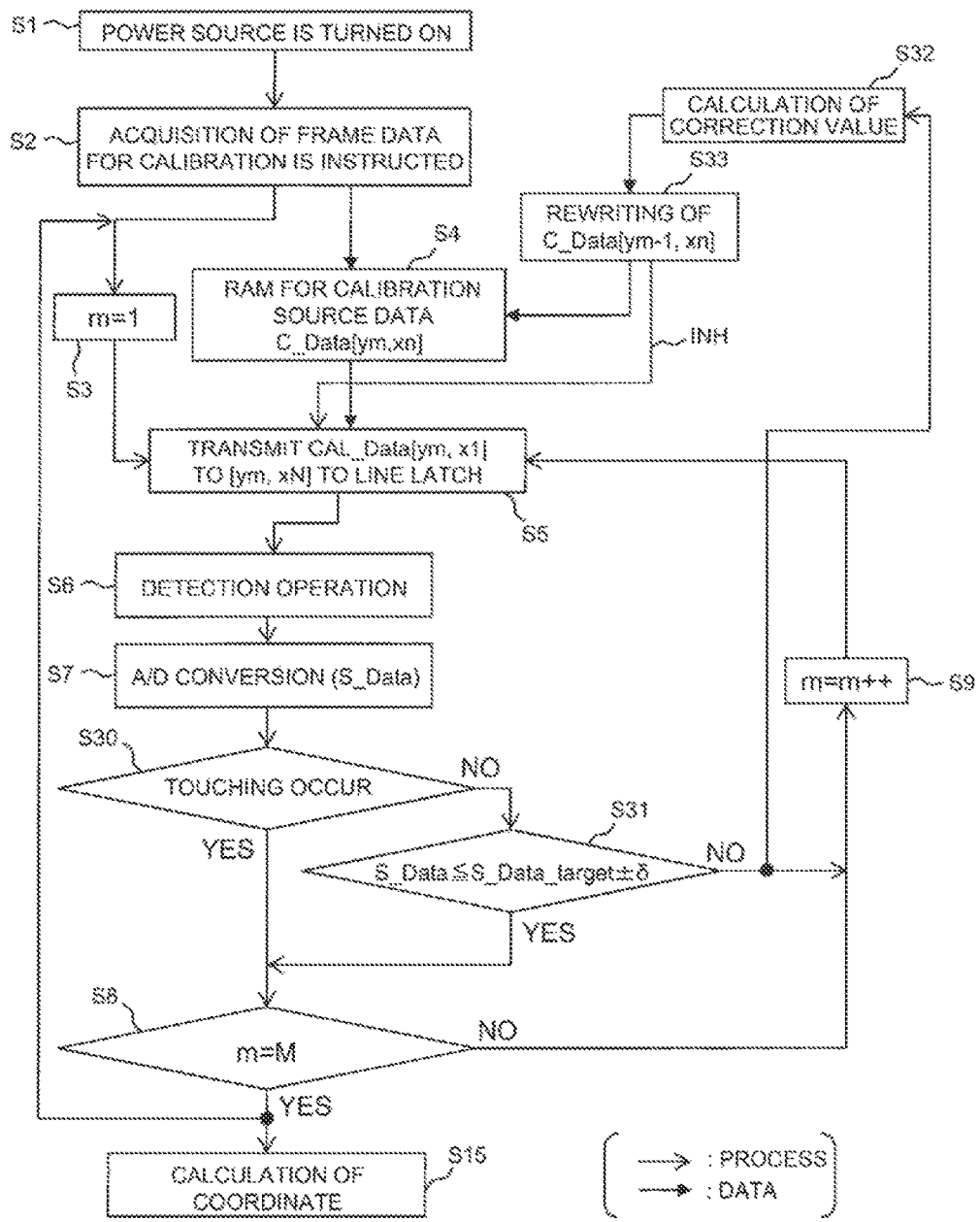
FIG. 22 is a flowchart illustrating generation of calibration data capable of coping with the environmental variation and a touch detection operation using the calibration data in the third embodiment.

FIG. 22 illustrates a flow of generation of calibration data capable of coping with the environmental variation and a touch detection operation using the calibration data in the third embodiment.

The calibration source data C_Data is generated in the same manner as the first and second embodiments. In addition, it is assumed that calibration source data C_Data is prepared in RAM 307 in order for creatable detection data S_Data in non-touching to be made uniform for each of the XY electrode intersections at least in a process of shipping portable information terminals.

When an operation power source is turned on (S1), as a part of an initialization operation, acquisition of data for calibration is instructed (S2). According to this, the sub-processor 5 transmits the above-described calibration source data C_Data to the RAM 307 embedded in the touch panel controller 3 from, for example, a storage device in the peripheral device 7 (S4). In combination with the transmission, a counter indicating a touch detection line is set to m=1 (S3). Then, the calibration source data C_Data stored in the RAM 307 is read out in a unit of a touch detection line indicated by the counter and is transmitted to the line latch 306 (S5). The calibration data CAL_Data, which is transmitted to the line latch 306, is D/A converted with the D/A converters 305_1 to 305_N, and offset adjustment in accordance with the D/A conversion result is performed with respect to, for example, inputs of the detection circuits 301_1 to 301_N. According to this, the detection circuits 301_1 to 301_N perform a detection operation by integrating signals that are shown in the detection electrodes X1 to XN, and acquire an analog detection signal VTG (S6). The detection signal VTG is converted to digital detection data S_Data by the A/D converters 302_1 to 302_N and is stored in the RAM 303. At this time, the sub-processor 5 determines whether or not touching occurs by using the detection data S_Data [ym, xn], which is stored in the RAM 303, of a touch detection line (S30). Determination of whether or not touching occurs may be performed in the same manner as the first and second embodiments.

In a case where touching does not occur, the process proceeds to step S31. In a case where touching occurs, it is determined that a relationship of m=M is satisfied (S8), and the counter value m is incremented to repeat the processes in steps S5 to S8, step S30, and step S31. In step S8, when m is determined as M, the sub-processor 5 determines whether or not touching occurs by using detection data pieces S_Data[y1, x1] to S_Data[yM, xN] which correspond to one frame of the touch detection frame and are stored in the RAM 303. In addition, the touch panel controller 3B returns to step S3, and repeats the above-described processes.

In step S31 to which the process transitions when it is determined in step S30 that touching does not occur, determination of a non-touching level is performed. When a target (S_Data_target) of the detection data in non-touching is set to S_Data=256 (dec), ideally, the detection data continuously satisfies a relationship of S_Data≅256. Here, when touching does not occur, in other words, in a case where a rapid variation does not occur in S_Data, and S_Data varies so as to increase or decrease from 256, and it is determined that the non-touching level varies due to a variation in an ambient environment, for example, a variation in a temperature. As a determination reference, a parameter δ is set. In a case where a relationship of S_Data≤256±δ is satisfied, it is determined that the environmental variation is small, and thus the detection operation is continuously performed without changing the calibration source data C_Data. In a case where a relationship of S_Data>256±δ is satisfied, it is determined that the environmental variation is large, and rewriting of the calibration source data C_Data is performed. Here, it is assumed that the parameter δ is determined in accordance with setting of the detection circuit 301. A variation ΔS_Data in the detection data S_Data in a case where the calibration source data C_Data varies by 1 can be predicted with circuit setting of the detection circuit 301, and thus δ may be set, for example, to ΔS_Data. In addition, in a case where a relationship of S_Data>256+δ is satisfied, calculation is performed to increase the calibration source data C_Data[ym−1, xn] by one (S32), and a corresponding address of the RAM 307 is rewritten by using the calculation result (S33). In addition, in a case where a relationship of S_Data<256−δ is satisfied, calculation is performed to decrease the calibration source data C_Data[ym−1, xn] by one (S3), and a corresponding address of the RAM 307 is rewritten by using the calculation result (S33). At this time, the calibration source data C_Data[ym−1, xn] that is a rewriting target is not used in the detection operation during rewriting, and the calibration source data C_Data[ym−1, xn] is used during detection after one subsequent frame. In addition, calibration source data, which is used in the detection operation performed in parallel during rewriting of the calibration source data C_Data[ym−1, xn], is C_Data[ym, xn], and thus reading and writing of the calibration source data does not occur at the same time. That is, during a writing operation of the RAM 307 in which the signal WEND is set to disable, the signal TENB is not set to disable, and reading-out of the calibration source data C_Data from the RAM 307 and transmission thereof to the line latch 306 are suppressed (INH).

According to this, the calibration source data is dynamically rewritten, and thus it is possible to perform touch detection offset adjustment in correspondence with the environmental variation. The RAM 308 or the register 322, which stores the calibration correction data similar to other embodiments, is not necessary. In addition, a configuration in which the calibration source data, that is a rewriting target, is not used in the detection operation can be easily ensured by control of the control unit 330. Accordingly, it is possible to perform calibration that corresponds to the environment in a stable manner while suppressing an increase in hardware.

Figure 23:
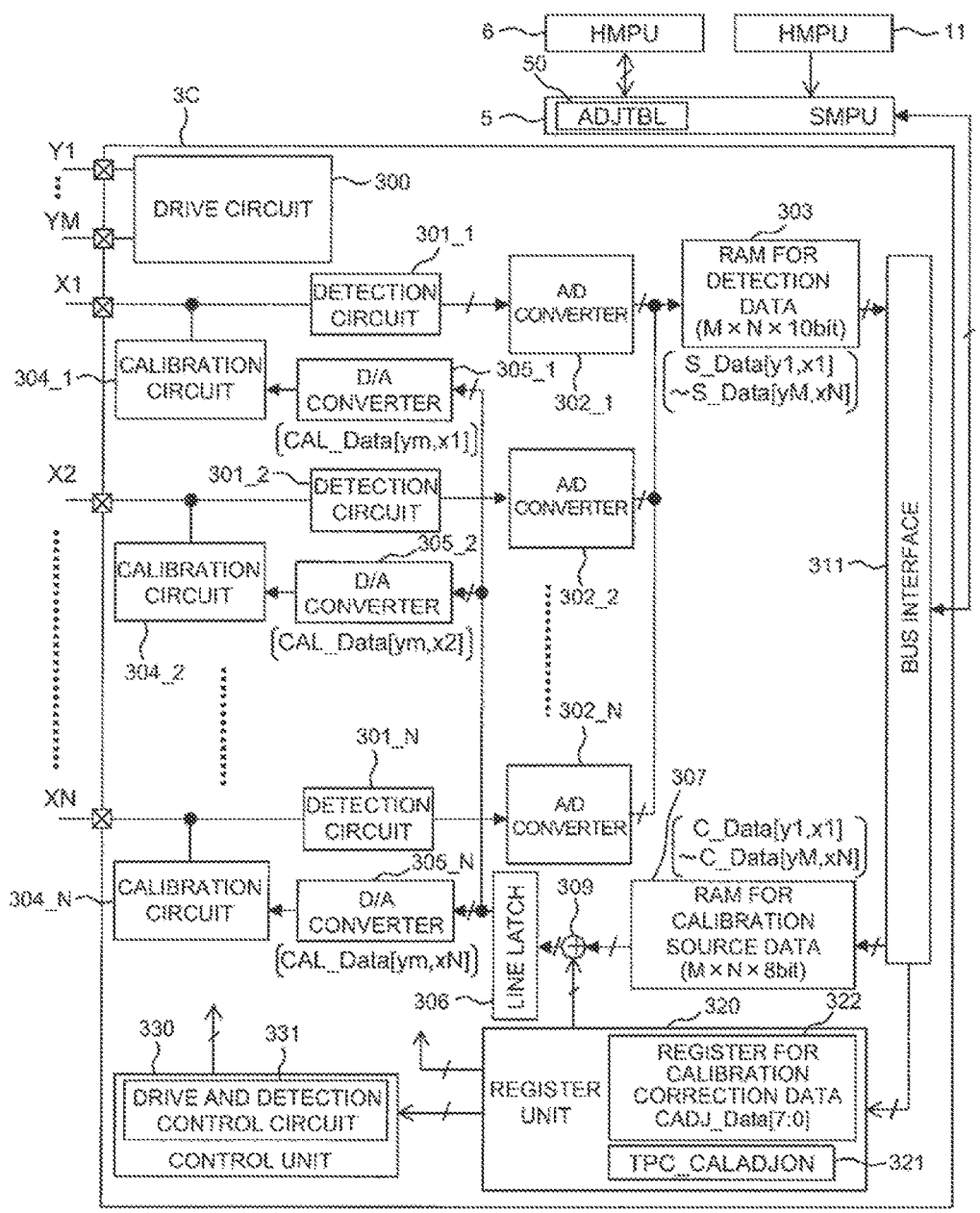
FIG. 23 is a block diagram illustrating a touch panel controller which generates calibration data corresponding to the environmental variation according to a fourth embodiment.

Fourth Embodiment of Generating Calibration Data Corresponding to Environmental Variation FIG. 23 illustrates a touch panel controller 3C according to a fourth embodiment in which calibration data corresponding to the environmental variation is generated. The touch panel controller 3C according to the fourth embodiment can be substituted for the touch panel controller 3 according to the first embodiment. The fourth embodiment is different from the second embodiment in that a temperature sensor 11 is disposed inside the portable information terminal TML, and the sub-processor 5 sets the calibration correction data CADJ_Data on the basis of a temperature measurement result. That is, the calibration correction data is not calculated on the basis of the detection data S_Data, and a value of the calibration correction data can be determined with reference to data table (ADJTBL) 50 and the like in accordance with an output of the temperature sensor 11. Accordingly, it is not necessary to calculate correction data, and thus data processing capacity allocated to the calibration correction data in the sub-processor 5 can be allocated to coordinate calculation, digital filtering, and other data processing. As a result, data processing capacity in the sub-processor 5 has a margin.

Figures 24, 25:
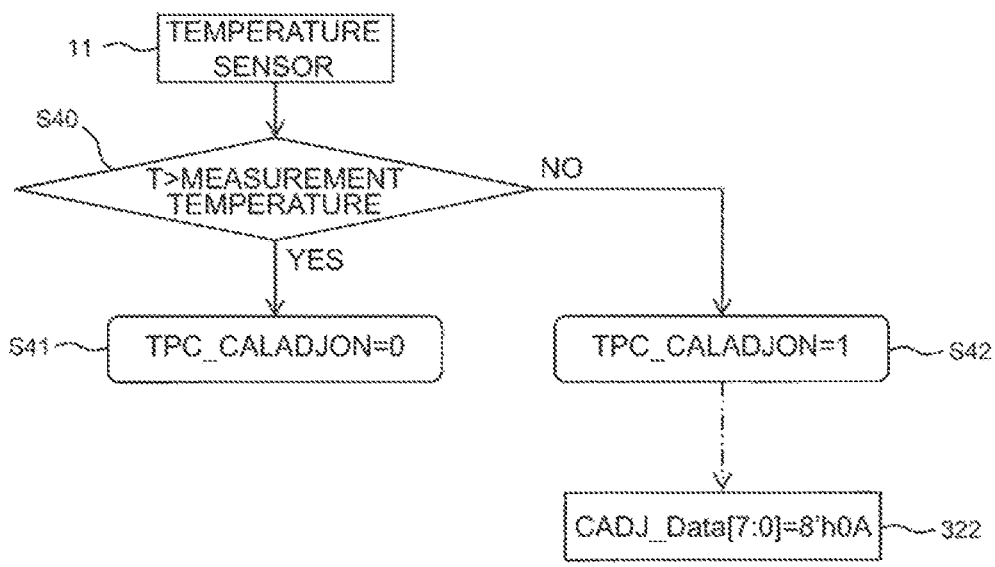
FIG. 24 is a flowchart illustrating a correction process flow in a case where a temperature sensor is provided.
FIG. 25 is an explanatory view illustrating an example of a truth-value in a case where a reference temperature of determination is set to a plurality of ranges.

FIG. 24 illustrates a correction process flow in a case where the temperature sensor is provided. In the fourth embodiment, a value of the calibration correction data with respect to a temperature is determined in advance. For example, the contents are defined in advance in software executed by the sub-processor 5 or in a data table that is referenced by the sub-processor 5, and the like.

In FIG. 24, a reference temperature when determining whether or not to perform correction is set to T (S40). In a case where the measurement temperature is lower than the reference temperature T, it is determined that correction of the calibration source data is not necessary, the control register value TPC_CALADJON is set to 0, and a calibration adjustment function is turned off (341). In contrast, in a case where the measurement temperature is higher than the reference temperature T, it is determined that correction of the calibration value is desirable, the control register value TPC_CALADJON is set to 1, and a calibration adjustment function is turned on (S42). A correction amount is determined with the register value TPC_CALADJ. In FIG. 24, for example, CADJ_Data[7:0] is set to 8'h0A. When referring to the truth-value in FIG. 11, the correction amount becomes +10, but this setting is illustrative only, and the correction amount is adjusted depending on temperature characteristics of the touch panel 1 or the touch panel controller 3C.

FIG. 25 illustrates an example of the truth-value in a case where the reference temperature of determination is set to a plurality of ranges similar to T1 to T5. In a case where the measurement temperature of the temperature sensor 11 is a room temperature of 25° C. corresponds to the range of T3, the CADJ_Data[7:0] is set to 8'h00, and the correction of the calibration source data C_Data is not performed. In the truth-value of FIG. 25, in a case where the measurement temperature is lower than a temperature range of T3, the correction value of the calibration correction data CADJ_Data[7:0] is set to a negative value. In addition, in a case where the measurement temperature is higher than the temperature range of T3, the correction amount of the calibration correction data CADJ_Data[7:0] is set to a positive value. Setting of the temperature range of T1 to T5 in the truth-value is not limited thereto. In addition, optimal setting of the calibration correction data CADJ_Data[7:0] with respect to the register 322 is changed in accordance with characteristics of the touch panel 1 or the touch panel controller 3C, and temperature setting for determination and the symbol of the correction amount can be changed in accordance with the structure of the touch panel 1 or a detection method.

The invention is not limited to the above-described embodiments, and various modifications can be made in a range not departing from the gist of the invention.

For example, the correction data CADJ_Data[7:0] in the second embodiment is not limited to one representative value among the entirety of the touch detection frame. For example, a plurality of representative values, which are classified into a central portion and a peripheral portion of the touch detection frame, may be set.

The detection circuit is not limited to integration. The detection circuit may be a circuit that performs an averaging process of sequentially averaging signals shown on the detection electrodes, and the like in order to generate detection signals, and the like. In other words, the detection circuit may be a circuit that performs an operation of processing signals shown in the detection electrodes in a sequential manner.

In addition, with regard to the A/D converter, outputs of the detection circuit may be sequentially selected and be A/D converted to reduce the number of the A/D converters or the number of A/D conversion channels.

In addition, the method of acquiring the calibration correction data is not limited to the methods based on an detection data error as described in the first and second embodiments, and as is the case with the fourth embodiment, a method, in which corresponding calibration correction data is selected on the basis of detection results of the environmental variation such as a variation in a temperature or humidity, may be applied thereto.

In addition, the calibration correction data CADJ_Data [7:0] as representative data is not limited one piece of data with respect to the entirety of the touch detection frame, and may be a plurality of pieces of representative data for respective portions such as an edge portion and the central portion of the frame. In this case, the register 322 may be configured as a parameter register capable of storing a plurality of pieces of representative data.

In a case of using a RAM, there is no limitation to the configuration in which the RAM 307 that stores calibration source data and the RAM 308 that stores the calibration correction data are separately provided, and both kinds of data may be stored in one dual-port RAM, and access to both kinds of data may be performed in parallel.

In addition, writing of the calibration correction data with respect to the RAM 308 is not limited to a configuration performed by command control of the sub-processor 5, and may be written by direct access of the sub-processor 5. In this case, it is desirable for the RAM 308 to be disposed in an address space of the sub-processor 5. A command to the register unit 320 represented by the parameter register 322 and data writing control may be performed in accordance with a register writing protocol.

In addition, the display panel is not limited to a liquid crystal panel, and may use other display types such as an EL panel and a plasma panel.

The semiconductor device may have a single chip configuration or a module multi-chip configuration.

Some additional examples are now provided.

The calibration circuit may be configured to adjust an amount of electric charge applied to an input of the detection circuit through a capacitive element coupled to the input, based on the first parameter data before or after the correction. The calibration circuit may be configured to adjust an addition or subtraction amount of voltage applied through an addition and subtraction circuit coupled to an output of the detection circuit, based on the first parameter data before or after the correction. The touch panel controller may include a mode register configured to selectively designate either a first mode causing the calibration circuit to operate on the basis of the first parameter data before the correction, or a second mode causing the calibration circuit to operate on the basis of third parameter data obtained by correcting the first parameter data with the second parameter data. The processor may be configured to set the mode register. The processor may be configured to perform control of selecting a value of the second parameter data, which is used to correct the first parameter data, on the basis of a detection result with respect to a variation in environment in which the touch detecting device is placed, and provide the selected second parameter data to the storage device of the touch panel controller. The calibration circuit may be configured to adjust an amount of electric charge, applied to an input of the detection circuit through a capacitive element coupled to the input, based on the first parameter data. The calibration circuit may be configured to adjust an addition or subtraction amount of voltage that is applied through an addition and subtraction circuit coupled to an output of the detection circuit, based on the first parameter data.

The calibration circuit may be configured to adjust an addition or subtraction amount of voltage that is applied through an addition and subtraction circuit coupled to an output of the detection circuit, based on the first parameter data, before or after the correction. The touch panel controller may include a mode register configured to selectively designate a first mode causing the calibration circuit to operate on the basis of the first parameter data before the correction, or a second mode allowing the calibration circuit to operate on the basis of third parameter data obtained by correcting the first parameter data based on the second parameter data. The semiconductor device may include a processor configured to perform data processing based on the detection data that is transmitted from the touch panel controller. The processor may be configured to determine that detection data in non-touching exceeds a permissible range based on the detection data transmitted from the touch panel controller for each of the interconnections of the X electrodes, and upon determining that the detection data exceeds the permissible range, perform control of calculating the second parameter data in a direction of cancelling a corresponding variation, and provide the calculated second parameter data to the storage device of the touch panel controller. The processor may be configured to perform control of selecting a value of the second parameter data based on a detection result with respect to a variation in environment in which the touch detecting device is placed, and provide the selected second parameter data to the storage device of the touch panel controller.

What is claimed is:
1. A touch detecting device, comprising:
a plurality of electrodes; and
a touch panel controller configured to generate detection data corresponding to changes in capacitance of the plurality of electrodes, the touch panel controller comprising:
a plurality of detection circuits, each detection circuit corresponding to a different one of the plurality of electrodes, a storage device configured to store first parameter data that specifies a first offset adjustment operation and second parameter data for correction of the first parameter data, a circuit configured to calculate third parameter data that specifies a second offset adjustment operation by correcting the first parameter data using the second parameter data, a calibration circuit configured to perform offset adjustment with respect to an input signal or an output signal of each of the detection circuits in a first mode of operation using the third parameter data without pausing touch detection or in a second mode of operation using the first parameter data before the third parameter data is calculated, and a mode register configured to designate whether the calibration circuit is to operate in the first mode or the second mode.

2. The touch detecting device according to claim 1, wherein:

the first parameter data comprises data corresponding to each capacitance of a plurality of capacitances of the plurality of electrodes, and the second parameter data comprises data corresponding to each capacitance of the plurality of capacitances of the plurality of electrodes.

3. The touch detecting device according to claim 1, wherein:

the first parameter data comprises data corresponding to each capacitance of a plurality of capacitances of the plurality of electrodes, and the second parameter data comprises representative data comprising data for representative correction of each capacitance of the plurality of capacitances of the plurality of electrodes.

4. The touch detecting device according to claim 2, wherein:

the storage device includes a first memory configured to store the first parameter data, and a second memory configured to store the second parameter data.

5. The touch detecting device according to claim 3, wherein:

the storage device includes a first memory configured to store the first parameter data, and a parameter register configured to store the representative data as the second parameter data.

6. The touch detecting device according to claim 1, wherein:

the touch panel controller includes a drive circuit configured to supply a pulse signal to a first set of the plurality of electrodes in an electrode arrangement order to drive the first set of the plurality of electrodes, the detection circuit is configured to detect a capacitance value of each of a plurality of capacitances of a second set of the plurality of electrodes, and when an electrode of the first set of the plurality of electrodes to which the pulse signal is applied is switched, the calibration circuit is configured to receive the corresponding first parameter data before or after the correction of the first parameter data.

7. The touch detecting device according to claim 1, wherein:

the circuit corrects the first parameter data using the second parameter data by adding or subtracting the second parameter data to or from the first parameter data.

8. The touch detecting device according to claim 7, wherein:

the calibration circuit is configured to adjust an amount of current of a constant current source coupled to an input of the detection circuit, based on the third parameter data.

9. The touch detecting device according to claim 1, further comprising a processor configured to:

determine that detection data in non-touching exceeds a permissible range based on the detection data transmitted from the touch panel controller for each interconnection between electrodes of the plurality of electrodes, and upon determining that the detection data exceeds the permissible range, perform control of calculating the second parameter data in a direction of cancelling a corresponding variation, and provide the calculated second parameter data to the storage device of the touch panel controller.

10. A touch detecting device, comprising:

a plurality of electrodes;

a touch panel controller configured to generate detection data for each capacitance of a plurality of capacitances corresponding to the plurality of electrodes, comprising:

a plurality of detection circuits, each detection circuit corresponding to a different electrode of the plurality of electrodes, a storage device that stores first parameter data, which specifies an offset adjustment operation, and a processor is configured to:

determine, based on the detection data associated with a first interconnection of the plurality of electrodes, that the detection data associated with the first interconnection is out of a permissible range when non-touching to the touch panel is detected based on the detection data, upon the determination, correct the first parameter data to cancel a variation from the permissible range by increasing or decreasing the first parameter data by a predetermined value, and write the corrected first parameter data into the storage device of the touch panel controller at a timing that does not overlap with an operation of reading out the first parameter data from the storage device, a calibration circuit configured to perform offset adjustment with respect to an input signal or an output signal of each of the detection circuits in a first mode of operation that employs the corrected first parameter data without pausing touch detection or in a second mode of operation that does not employ the corrected first parameter data, and a mode register configured to designate whether the calibration circuit is to operate in the first mode or the second mode.

11. The touch detecting device according to claim 10, further comprising:

a drive circuit configured to supply a pulse signal to a first set of the plurality of electrodes in an electrode arrangement order to drive the first set of the plurality of electrodes, wherein:

the detection circuit is configured to detect a capacitance value of each capacitance of a plurality of capacitances corresponding to a second set of the plurality of electrodes, and when a first electrode of the first set of the plurality of electrodes, to which the pulse signal is applied is switched, the calibration circuit is configured to receive the corresponding first parameter data from the storage device.

12. The touch detecting device according to claim 11, wherein:
the touch panel controller is configured to:
sequentially drive the first set of the plurality of electrodes, and
provide the detection data to the processor in a drive unit of the first electrode, and
the processor is configured to perform control of providing the corresponding corrected first parameter data to the storage device of the touch panel controller at a timing before the first electrode is driven a next time for acquisition of detection data.

13. The touch detecting device according to claim 10, wherein:
the calibration circuit is configured to adjust an amount of current of a constant current source, that is coupled to an input of the detection circuit, with the first parameter data.

14. A semiconductor device configured to generate detection data corresponding to changes in capacitance of a plurality of electrodes of a touch panel, the semiconductor device comprising:
a plurality of detection circuits, each detection circuit corresponding to a different electrode of the plurality of electrodes;
a storage device configured to store first parameter data, that specifies a first offset adjustment operation, and second parameter data; and
a circuit configured to calculate third parameter data, that specifies a second offset adjustment operation, by correcting the first parameter data using the second parameter data;
a calibration circuit configured to perform offset adjustment with respect to an input signal or an output signal of each of the detection circuits in a first mode of operation using the third parameter data without pausing touch detection or in a second mode of operation using the first parameter data before the third parameter data is calculated; and
a mode register configured to designate whether the calibration circuit is to operate in the first mode or the second mode.

15. The semiconductor device according to claim 14, wherein:
the first parameter data comprises data corresponding to each capacitance of a plurality of capacitances of the plurality of electrodes, and
the second parameter data comprises data corresponding to each capacitance of the plurality of capacitances of the plurality of electrodes.

16. The semiconductor device according to claim 14, wherein:
the first parameter data comprises data corresponding to each capacitance of a plurality of capacitances of the plurality of electrodes
the second parameter data comprises representative data for representative correction of each capacitance of the plurality of capacitances of the plurality of electrodes.

17. The semiconductor device according to claim 14, wherein:
the touch panel includes a drive circuit configured to supply a pulse signal to a first set of the plurality of electrodes in an electrode arrangement order to drive the first set of the plurality of electrodes,
the detection circuit detects a capacitance value of each of the a plurality of capacitances of the first set of the plurality of electrodes, and
when an electrode of the first set to which the pulse signal is applied is switched, the calibration circuit is configured to receive the corresponding first parameter data before or after the correction.

18. The semiconductor device according to claim 14, wherein:
the circuit corrects the first parameter data using the second parameter data by adding or subtracting the second parameter data to or from the first parameter data.

19. The semiconductor device according to claim 18, wherein:
the calibration circuit is configured to adjust an amount of current of a constant current source, coupled to an input of the detection circuit, based on the third parameter data.

20. The semiconductor device according to claim 19, wherein:
the calibration circuit is configured to adjust an amount of electric charge, applied to an input of the detection circuit through a capacitive element coupled to the input, based on the third parameter data.

* * * * *

UNITED STATES PATENT AND TRADEMARK OFFICE
CERTIFICATE OF CORRECTION

PATENT NO.         : 10,209,835 B2
APPLICATION NO.    : 14/577708
DATED              : February 19, 2019
INVENTOR(S)        : Akihito Akai and Takayuki Noto It is certified that error appears in the above-identified patent and that said Letters Patent is hereby corrected as shown below:

In the Claims

In Column 38, Line 23, in Claim 17, delete "the a" and insert -- the --, therefor.

Signed and Sealed this
Twenty-first Day of April, 2020

Andrei Iancu
*Director of the United States Patent and Trademark Office*